United States Patent [19]
Lang et al.

[11] Patent Number: 4,870,580
[45] Date of Patent: Sep. 26, 1989

[54] COMPRESSIONAL/SHEAR WAVE SEPARATION IN VERTICAL SEISMIC PROFILING

[75] Inventors: Stephen W. Lang, Hollis, N.H.; Michael L. Oristaglio, Paris, France

[73] Assignee: Schlumberger Technology Corporation, New York, N.Y.

[21] Appl. No.: 856,608

[22] Filed: Apr. 25, 1986

Related U.S. Application Data

[63] Continuation-in-part of Ser. No. 567,359, Dec. 30, 1983, Pat. No. 4,648,039.

[51] Int. Cl.$^4$ .......................... G01V 1/36; G01V 1/34; G01V 1/28
[52] U.S. Cl. ..................................... 364/421; 367/68; 367/47
[58] Field of Search ................................ 364/420–422, 364/47, 68, 59, 421, 422, 420

[56] References Cited

U.S. PATENT DOCUMENTS

| | | | |
|---|---|---|---|
| 4,648,039 | 3/1987 | Devaney | 364/421 |
| 4,706,224 | 11/1987 | Alfred | 364/421 X |

Primary Examiner—Jerry Smith
Assistant Examiner—Charles B. Meyer
Attorney, Agent, or Firm—Cooper & Dunham

[57] ABSTRACT

Disclosed is separation of the compressional and shear components of the wavefield measured in 3-component vertical seismic profiling. The separation involves working in the zx plane defined by the borehole axis (z) and the surface seismic source space therefrom along the x-axis, and in successive and overlapping windows each defined by (i) a depth interval centered at the depth level currently being processed and including several depth levels above and below and (ii) a time interval sufficiently long to allow the relevant seismic wavefield to be measured by the geophones. The total wavefield measurements in a window are rotated to give the wavefield along the borehole axis (z) and that perpendicular to it in the zx plane of interest. In one embodiment, the result is forward Fourier transformed in two dimensions, then filtered in wavenumber-frequency space by means of a matrix filter which depends on previously estimated compressional and shear speeds of the region that produced the VSP measurements being filtered, and the result is inverse Fourier transformed to derive the compressional component. Subtracting the compressional component from the total measured wavefield gives the shear component. The corresponding operations performed entirely in the spatial domain give corresponding results. In another embodiment, better suited to thin beds, the wavefield components along the x-axis and the z-axis are forward Fourier transformed only temporally, in one dimension, the result is filtered in the space-frequency domain with a space-variant filter which can be different for each borehole depth, and the result is inverse-transformed back to the space-time domain to derive the compressional component.

27 Claims, 20 Drawing Sheets

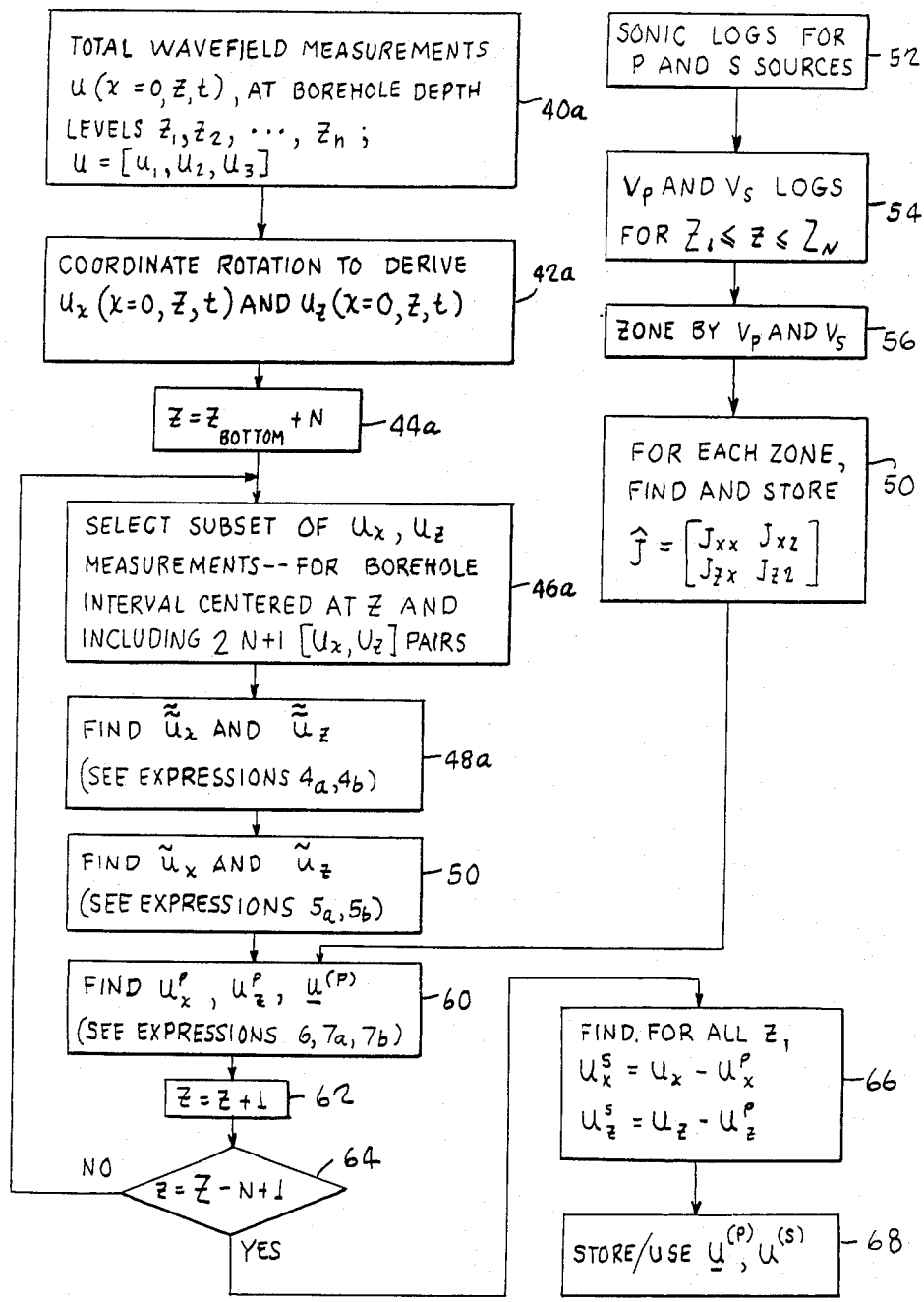

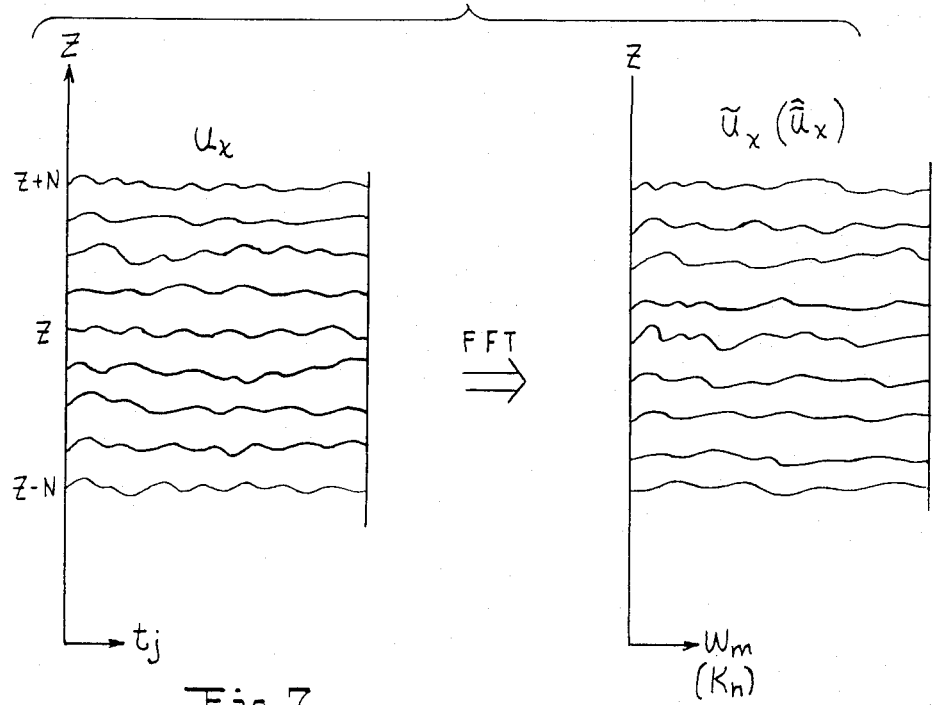
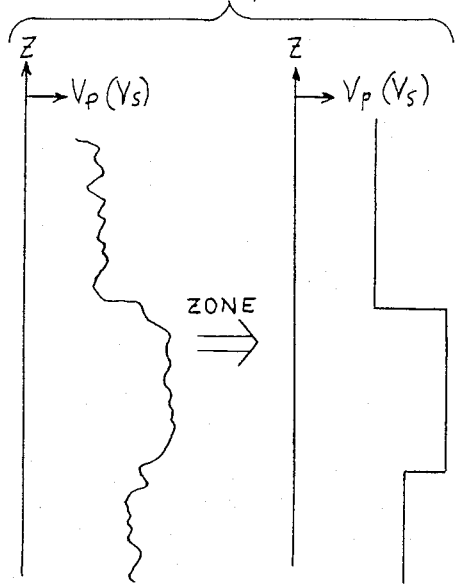
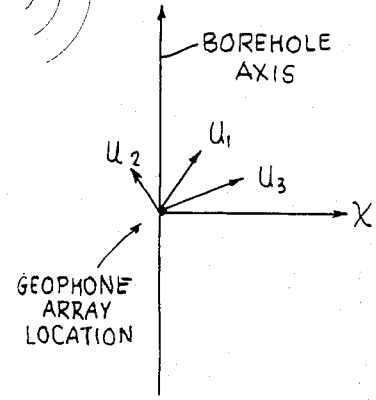

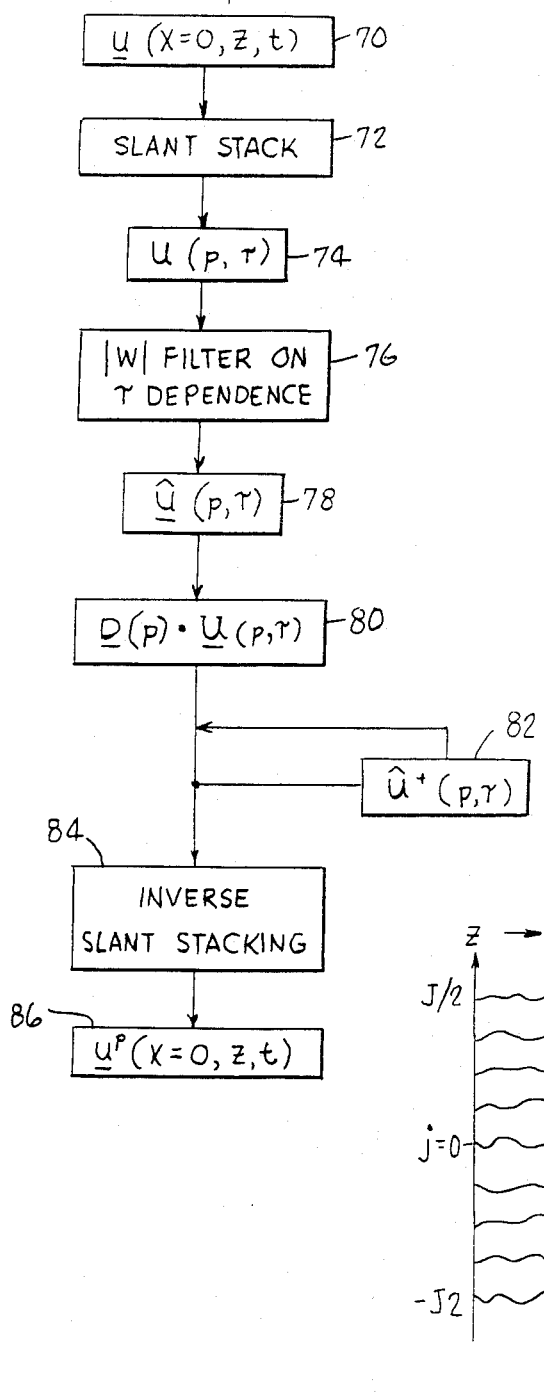
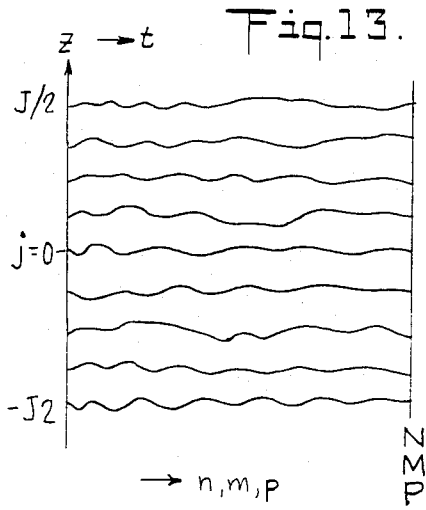

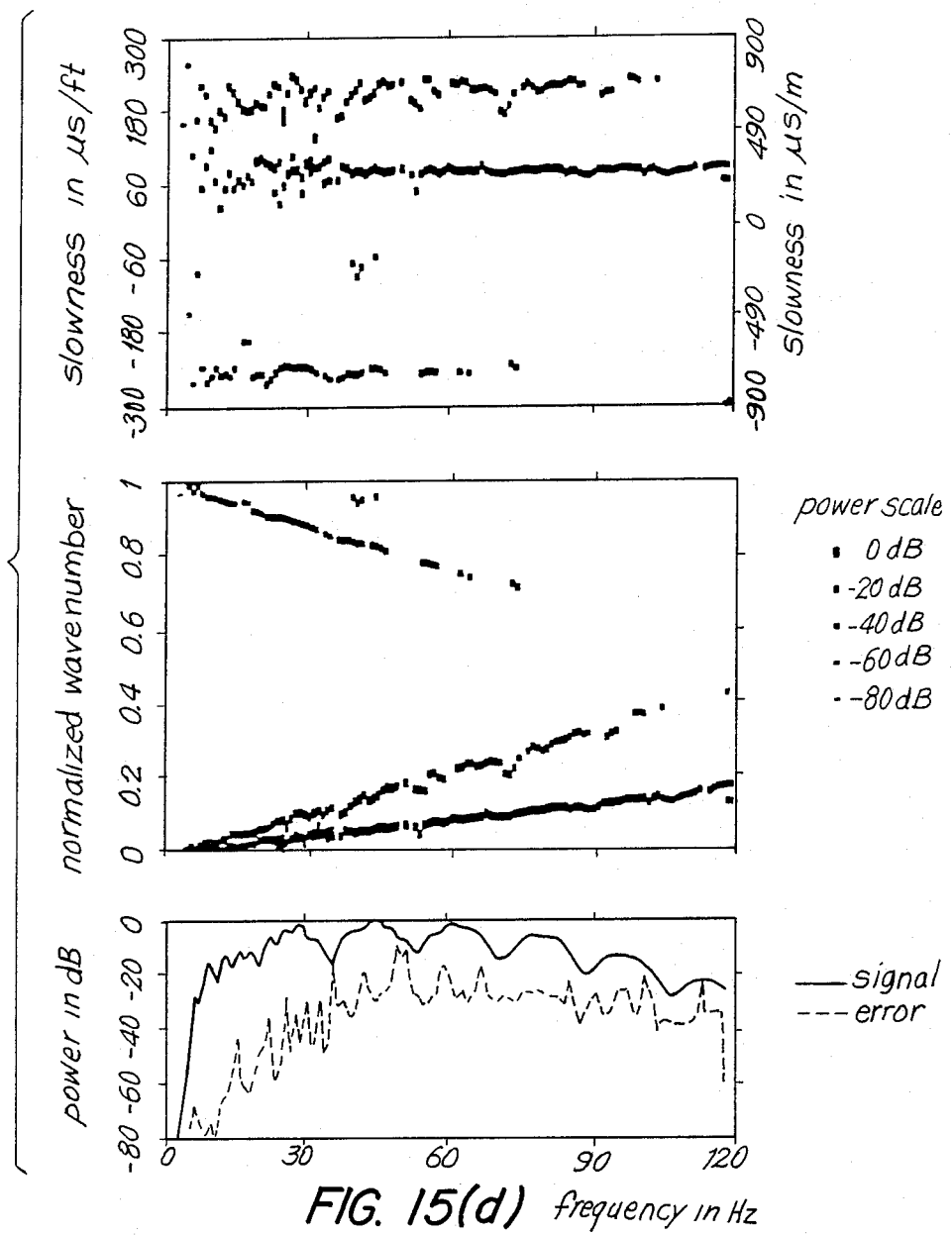
FIG. 15(d) frequency in Hz

COMPRESSIONAL/SHEAR WAVE SEPARATION IN VERTICAL SEISMIC PROFILING

REFERENCE TO RELATED APPLICATION

This application is a continuation-in-part of parent patent application Ser. No. 567,359 filed on Dec. 30, 1983 in the name of Messrs. Devaney, Oristaglio and Wolf, now U.S. Pat. No. 4,648,039 and assigned to the same assignee as this continuation-in-part application, which is filed in the name of Messrs. Lang and Oristaglio. The entire parent application is incorporated by reference in this disclosure as though fully set forth herein.

BACKGROUND AND SUMMARY OF THE INVENTION

The invention is in the field of seismic surveys useful in exploring for valuable subsurface resources. One aspect of the invention concerns vertical seismic profiling and more particularly separating the compressional and shear components of the vector wavefield measured in vertical seismic profiling. Another aspect concerns similar separation in surface seismics (also called horizontal profiling).

Vertical seismic profiling, often abbreviated as VSP, is a technique in which a seismic signal generated at or near the surface of the earth is recorded by geophones secured at various depths to the wall of a borehole. Unlike the more commonly used horizontal seismic profiling, where the geophones are strung along the earth surface, vertical seismic profiling uses geophones at locations spaced along the borehole axis. These geophones typically respond to both upgoing and downgoing seismic events, in contrast to horizontal seismic profiling, where the geophones typically cannot respond directly to downgoing events. The distance between geophone recording locations in vertical seismic profiling is typically a small fraction of that used in horizontal profiling.

Vertical seismic profiling measurements can give insight into some fundamental properties of propagating seismic waves and assist in the structural, stratigraphic, and lithological interpretation of subsurface formations. For example, an important use of VSP measurements is to help define upgoing and downgoing seismic events within the earth and thereby help determine which events arriving at the surface are primary reflections and which are multiples. Other applications of VSP include estimation of reflector dip, correlation of shear wave reflections with compressional wave reflections, location of fault planes, determination of lithological effects on propagating wavelets, looking for reflectors ahead of the drill bit, determining hydrocarbon effects on propagating wavelets, identification of intrabed multiples, measurement of both compressional and shear wave velocities, and estimation of the conversion of compressional to shear and shear to compressional energy modes within the earth. Background information concerning VSP can be found in Hardage, B.A., Vertical Seismic Profiling, Part A: Principles, Geophysical Press, 1983, Volume 14A of Handbook Of Geophysical Exploration, Section I. Seismic Exploration, Helbig and Treitel (Editors); Society of Exploration Geophysics, Expanded Abstracts of the Technical Program With Authors' Biographies, Sept. 11-15, 1983, Las Vegas, Nev., pp. 522-540; Wuenschel, P.C., The Vertical Array In Reflection Seismology—Some Experimental Studies, Geophysics, Volume 41, No. 2 (Apr. 1976), pp. 219-232; and U.S. Pat. Nos. 4,383,308 and 4,563,757.

As discussed in greater detail in these background documents, which are hereby incorporated by reference, in principle vertical seismic profiling involves providing a seismic source at or near the earth surface and near a borehole, and providing vertical seismic profile measurements by means of geophones positioned at selected depth levels in the borehole. While it should be possible to position geophones at each desired depth in the borehole such that all can respond to the same seismic event generated by the source, it is believed typical, at least in the Western world, to use instead a geophone (or geophones) carried by a single seismic tool which is suspended by cable in the borehole and is successively clamped to the borehole wall at selected depths, to thereby respond to different wavelets from the source at different depths. Various kinds of seismic sources can be used, and typically it is desirable that the source produce a consistent and repeatable shot wavelet, particularly when a single downhole geophone tool is used. For example, the source can be a small chemical explosive shot near the bottom of a relatively shallow, cased and cemented well drilled near the borehole, or it can be one of the impulsive surface sources, such as weight droppers and devices that use explosive gases or compressed air to drive a heavy pad vertically downward with great force, or vibrators of the kind used as energy sources in hydrocarbon exploration. The borehole can be vertical or deviated, so long as the deviation is accounted for in interpreting the measurements, and can be cased or uncased. A typical downhole tool used in vertical seismic profiling typically contains at least one geophone that is sufficiently protected to withstand the adverse environment in a deep borehole and yet can achieve satisfactory acoustic coupling with the formation. Two typical configurations are a tool that has a retractable electrically operated pivot arm which can press the geophone(s) against the borehole wall at selected depth levels, and a tool with a retractable electrically driven telescoping ram serving the same purpose. The geophone transducer element or elements in a VSP tool can be either only vertically oriented or can be, for example, in a 3-component orientation (e.g., orthogonal at xyz or tilted relative to each other at some other angle, e.g., at 54°). In 3-component xyz geometry, the geophone along the z (depth) axis in a vertical borehole measures vertical particle motion, and the geophones oriented along the x and y directions measure particle motion along two orthogonal directions in the horizontal plane. Typically the three geophones are designed to exhibit closely matched amplitude and phase responses, and the device that presses the tool against the borehole wall is designed to create a geophone-to-formation bond which would result in the horizontal geophones being mechanically coupled to the formation in the same way as the vertical geophone. A 3-component tool typically also includes an orientation measuring device (typically made up of one or more magnetometers that measure azimuth from magnetic North and one or more gravity sensitive accelerometers that measure deviation from vertical), a downhole digitizing system which can digitize the geophone transducer outputs within the tool and send the digitized signals up to the surface through wires in the cable suspending the tool, and other equipment, such as devices to check the quality of acoustic coupling with the formation. Known processing equipment and techniques can be used at the surface to record the tool outputs and make preliminary corrections, such as for tool orientations, to thereby produce vector measurements which can be designated u (x=0,z,t). Each such measurement can be a digitized vector set identifying the direction in space and the magnitude of the seismic energy measured by the 3-component VSP tool at the borehole (x=0) at depth z for each sample time t over a selected time interval. See U.S. Pat. No. 4,563,757.

Typically the output of any given geophone contains contribution from both compressional and shear wave components (and may contain contributions from other wave components) even when the surface seismic source is designed to optimize the generation of compressional and minimize the generation of shear waves. Even if the surface source could generate a purely compressional wave, a considerable amount of compressional wave energy may still be converted into shear wave modes whenever a propagating compressional wave encounters a reflecting surface at an oblique angle of incidence. It is believed that these converted shear wave modes can be valuable for interpreting subsurface geological conditions, as can be shear modes deliberately created by shear wave energy sources. For example, converted shear wave modes can be particularly valuable seismic measurements when used in concert with compressional wave energy measurements to interpret elastic constants of rocks or to predict the types of pore fluids in rock units or to predict other subsurface lithology parameters. In addition, certain techniques can benefit from such separation because they need, or are believed to work better with, direct or indirect measurements of only the compressional, or only the shear components of the total energy arriving at downhole geophones. One example is the use of a technique similar to medical computed tomography and relying on offset VSP, or on well-to-well VSP measurements to image the zx plane of interest. Such a technique is helped by the use of data representing the separated compressional (or perhaps shear) component of the total energy measured at the downhole geophones. In surface seismics, typically it is assumed that the geophones measure primarily the compressional component of the arriving seismic energy, and it is believed that typically little or no effort is made to separate the shear component contributions and thereby improve the results of processes based on compressional wave considerations.

For these and other reasons, proposals have been made in the past to separate the compressional and shear wave components of the seismic energy measured at a VSP geophone. For example, the Hardage document cited earlier proposes, e.g. at page 413, that with a 3-component tool the responses of the triaxial geophone system can be mathematically rotated so that they represent the output of a single geophone oriented along the ray path of the compressional wave first arrival at each recording level, and that data can be derived which represent the response that a geophone would record if it were positioned in a vertical plane containing the compressional wave first arrival ray path and then oriented in this plane so that it is normal to the compressional wave ray path, and that these data thus would contain the full response of those downgoing shear velocity modes which travel along the same ray path as the compressional wave direct arrival, partial responses of SV modes which arrive at the triaxial geophone arrangement along ray paths that differ from the compressional wave ray path, and partial responses of later arriving downgoing or upgoing compressional wave events whose ray paths intersect the geophone assembly at various angles of inclination. The earlier cited document concerning the technical program of Sept. 11-15 1983 in Las Vegas, Nev. proposes, e.g. at page 522, that for processing VSP data from compressional wave or shear wave sources, the apparent velocity between recording positions can be used to separate upgoing and downgoing waves, and that similarly, the P, SV, and SH modes for the direct arrival in a VSP can be isolated, based on their orthogonal polarization, but reports that both techniques break down when analyzing complex wave types such as converted waves. The same document proposes at pages 524-527 a technique which involves considering the first compressional (P) ray as included in the source-well plane, deriving a projection along the first arriving P ray, which should give mainly the first arriving P ray and following multiples, deriving a projection which is normal to that first arriving P ray and is in the source-well plane, which should give direct and converted shear SV waves, and deriving a projection normal to the source-well plane, which should give shear SH waves. The Hardage document cited earlier observes, e.g. at pages 177 and 178, that when VSP measurements taken in the space-time domain are converted to the frequency-wavenumber domain, a masking function could be superimposed over the VSP data in the frequency-wavenumber domain in order to suppress events not travelling with compressional velocity, and gives a conceptual illustration at FIG. 5-20 of a so-called pie slice velocity band pass masking function which would reduce the magnitudes of all energy modes except the upgoing compressional reflections. Other types of frequency-wavenumber velocity filtering are also discussed in the Hardage document, e.g. at pages 174-176.

It is believed that said earlier separation proposals can give useful results when the subsurface environment is relatively simple, e.g., when it can be expected that compressional and direct and converted shear modes would not arrive at a given geophone location at the same time. However, in practice the typical environment can be sufficiently complex to defeat such velocity or polarization separation techniques. Therefore, it is believed that a need remains for accurately and efficiently separating the compressional and shear wave components in seismic profiling, and it is this need that the invention seeks to meet.

The invention makes use of the unexpected discovery that, if certain assumptions are made about the properties of the geological formation and the wavefield, and some knowledge available from VSP and/or other logs is used, it is possible to relate the compressional wave component to the total measured wave vector through an analytical expression which can be sufficiently accurate to give useful results. The assumptions believed most important are that the subsurface formation is locally homogeneous (for example, over intervals of at least about 3 wavelengths) in the region of measurements, and that the elastic wavefield is approximately constant in the direction normal to the plane containing the source and the borehole. The knowledge derived from VSP and/or other logs (e.g., sonic) can comprise the local compressional and shear velocities and/or the local slowness, such as the local slowness of waves in the vector wavefield. Because of the assumption that the formations adjacent the borehole are locally isotropic, there is only a single inherent P or S velocity for a given depth, and it can be assumed to be that measured by a sonic logging tool or by a zero-offset VSP. In principle, the main steps of an embodiment of the invention are to decompose the 3-component measurements into local plane wave components, identify the P and S waves of each plane wave component by polarization, and separately recombine the so-identified P and S waves.

In a particular and nonlimiting example, the sought compressional component is related to the total measured wavefield vector through a transfer function (filter) in matrix form which depends on local acoustic properties of the formation, and hence typically changes with borehole depths. These local properties are measured or deduced beforehand, for example by VSP and/or compressional and shear sonic well logging. As a specific example, the variations of compressional velocity and shear velocity with borehole depth are measured, e.g. by compressional wave source and by shear wave source sonic logging, and the results are used to produce a 2-dimensional matrix filter. VSP (vertical seismic profiling) is then used to measure the vector wavefield for each depth level of interest, e.g. with a 3-component tool. After any preliminary processing of the VSP measurements (e.g. to account for tool orientation and seismic energy attenuation), a subset made up of measurements within a given window in borehole depth and in time is forward Fourier transformed, for example by a commercially available FFT processor, to convert it to measurements in a corresponding window in wavenumber-frequency space. The resulting subset of converted measurements is then combined, for example in a dot product operation, with the transfer function (filter) for the borehole depth interval in that window. The result is subjected to inverse Fourier transformation, for example again by means of a commercially available FFT processor, to thereby derive a vector quantity representative of the compressional wave vector at the given borehole depth. Vector subtraction of this compressional wave vector from the total measured vector wavefield for that depth gives a vector quantity representative of the shear wave vector component at the same given borehole depth. The procedure is repeated for other depth levels. In a second exemplary embodiment, the corresponding steps can be carried out entirely in the spatial domain, without excursions into wavenumber-frequency space, to give corresponding end results.

In the embodiments described above the process can be thought of as a multi-channel (vertical and horizontal particle motion), multi-dimensional (time and depth) filtering operation. The required filters have impulse responses which are both spatially and temporally infinite, or at least seek to approximate such responses within practical constraints, despite the fact that actual recordings of measurements are far from being infinite in extent. However, it has been discovered that overall accuracy can suffer significantly when the vertical spatial extent of the seismic measurements is severely limited, for example because measurements are not taken for all depths of interest, or because the approximations of constant velocity are only valid over a severely limited vertical interval. One practical example where this can occur is when very thin beds are encountered in the subsurface formations of interest. Usually, no difficulties are encountered with respect to the effort to approximate the effect of filter with a temporally infinite impulse response, because the VSP measurements are or can be taken over a sufficiently long time period and sampled at a suitable rate. These considerations have led to the discovery of a third implementation of the invention, which works particularly well in cases where the first and second embodiments may give less accurate results, and also works well in cases in which the nature of the original measurements and of the subsurface formations allow for the fully successful use of the first and second embodiments. In this third implementation, filters with a spatially finite impulse response are used on measurements from a finite depth interval; however, the frequency-wavenumber response of such filters can only approximate the desired frequency-wavenumber response. Often, much of the energy of the measurements is concentrated along a few rays in frequency-wavenumber space, corresponding to a small number of apparent (vertical) velocities. In accordance with the third implementation of the invention, the frequency-wavenumber response of the finite length filters can be made to coincide with the desired response on these rays, to minimize the error in the reconstructed compressional and shear waves. However, to do this, separate filters are required for the respective depth points in the borehole; the resulting collection of filters can be thought of as a single shift-varying filter. The original measurements can be analyzed to determine the predominant apparent velocities for the respective depth levels, and the separation can be done using shift-varying filters designed to minimize error at these velocities.

In an exemplary and nonlimiting embodiment of the third implementation of the invention, the VSP traces for the horizontal and vertical components of the wavefield for the respective depth points in the borehole are transformed in time, into the space-frequency domain. In that domain, they are filtered at each temporal frequency independently. The samples of the reconstructed compressional wave are produced in that space, and are inverse-transformed (in time) to obtain the reconstructed P-component time waveform. The reconstructed compressional component is subtracted from the starting waveform to obtain the reconstructed shear component time waveform. Advantage can be taken of the fact that the starting and reconstructed waveforms must be realvalued, to perform the intermediate processing (filtering) only on the temporal transform values for positive frequencies. The requisite filter can be derived, in accordance with one example of the invention, from the original VSP measurements.

In the first embodiment of the invention a double Fourier transformation of the VSP measurements is used, from the space-time to the wavenumber-frequency space, and the filtering is done in wavenumber-frequency space and the result is double transformed back to the space-time domain. In the second embodiment, the equivalent operations are carried out entirely in the space-time domain. In contrast, in the third embodiment, only a single (temporal) Fourier transformation is used, the filtering is performed in the space-frequency domain, and the result is inverse-transformed back to the space-time domain through a single (temporal) inverse Fourier transformation.

The invented principles, while described in detail only for VSP separation, apply to surface seismics separation as well.

BRIEF DESCRIPTION OF THE DRAWINGS

FIG. 4d is a flowchart describing certain steps of a process embodying an example of the invention.

FIG. 5 is an illustration useful in explaining coordinate rotation.

FIG. 6 is an illustration useful in explaining transformation of VSP measurements from the spatial to the wavenumber-frequency domain.

FIG. 7 is an illustration useful in explaining zoning of sonic logs.

FIG. 12 illustrates steps of a process which embodies an example of the invention and is carried out entirely in the spatial domain.

FIG. 13 shows a spatial domain window useful in explaining filtering steps illustrated in FIG. 12.

FIG. 15d illustrates estimates of slowness of the seismic energy in layer 4.

DETAILED DESCRIPTION

Figure 1:
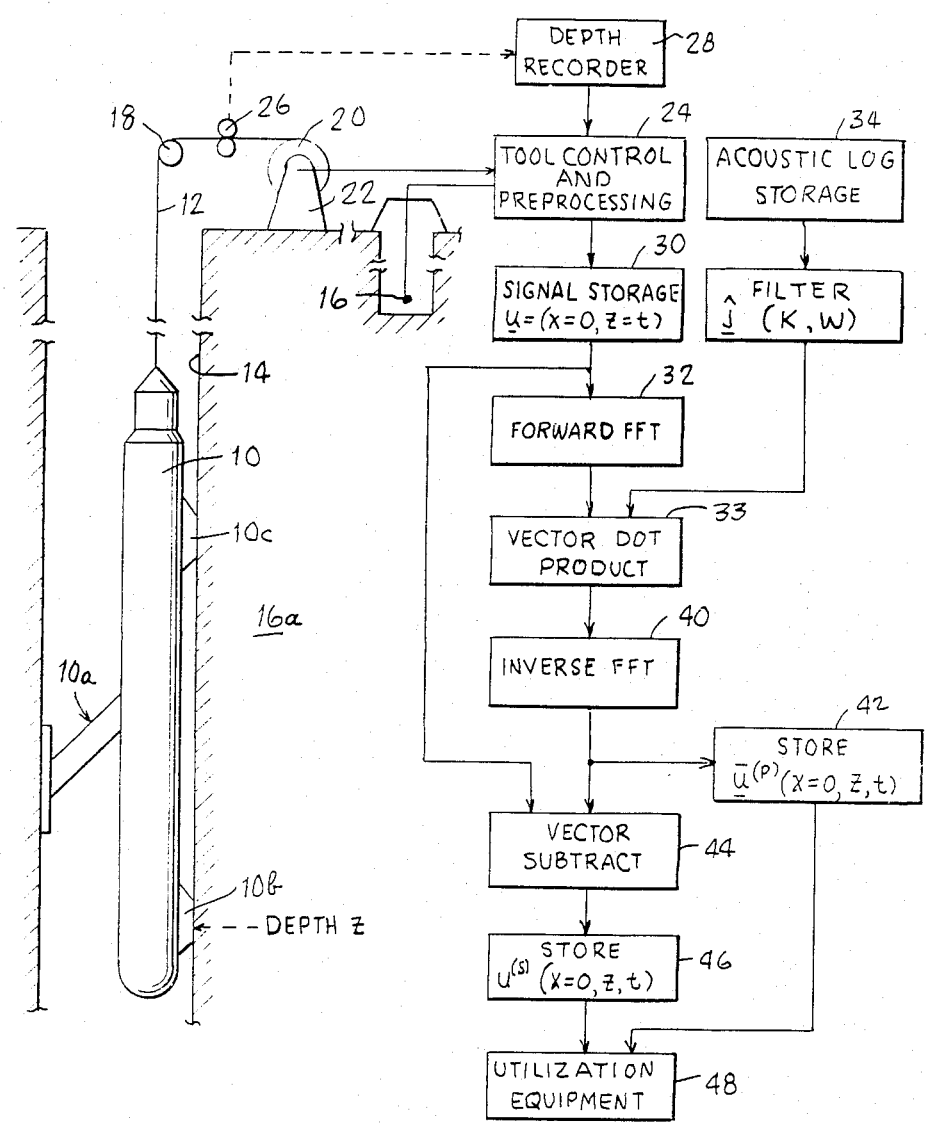
FIG. 1 is an overall schematic illustration of a vertical seismic profiling system making use of an exemplary embodiment of the invention.

Referring to FIG. 1 for an overall schematic illustration of a vertical seismic profiling system making use of a nonlimiting example of the invention, a VSP tool 10 is lowered on an armored multiconductor cable 12 into a borehole 14 to take VSP measurements of subsurface formations 16a. Tool 10 is adapted for movement up and down borehole 14 and includes pivoted, power-driven clamping arm arrangement 10a, geophone pad 10b, another pad 10c and various internal subsystems. Tools of this type are discussed in the documents incorporated by reference, and a particular tool suitable for the purpose is shown in U.S. Pat. No. 4,563,757, assigned to the assignee of this invention. The geophones in pad 10b are clamped against the wall of borehole 14 at borehole depth level z by means of arm 10a, and measure seismic energy originating at a seismic source 16. These measurements are digitized by circuitry (not shown) in tool 10, and the result is sent up via conductors within armored cable 12. Cable 12 goes to a sheave wheel 18 at the surface and then to a suitable drum and winch mechanism 20 which raises and lowers tool 10 in borehole 14 as desired. Electrical connections between tool 10 and surface equipment are made through suitable multielement slipring and brush contact assembly 22. A surface unit 24 contains tool control and preprocessing equipment which communicates with tool 10 via cable 12, and with seismic source 16 via another cable. Cable 12 also runs through a measuring wheel unit designated 26 which provides signals indicative of the current borehole depth level z of geophone pad 10b. These depth signals are recorded at unit 28 so that a given et of outputs of the geophones in pad 10b can be associated with a respective depth in the borehole.

In operation, tool 10, with clamping arm 10a retracted, is lowered to the bottom of borehole 14 (or to the lowest depth level of interest), arm 10a is extended to clamp pad 10b in good acoustic contact with the wall of borehole 14, and a seismic signal is generated at source 16. The acoustic energy measure by the geophones in pad 10b is digitized and sent up to unit 24 for any preprocessing, such as to account for tool orientation and seismic energy attenuation with travel time, and the resulting measurements are stored in unit 30, for example in the form of a vector set u(x=0,z,t), which stands for the vector wavefield measured for borehole depth level z at sample times t and includes a component along the borehole and a component which is perpendicular to the borehole but is in the plane which contains the measurement location and the seismic source location. Tool 10 is then moved up along the borehole such that pad 10b can be clamped satisfactorily at another selected depth level, another seismic signal is generated at source 16 and the seismic energy arriving at the geophones in pad 10b is similarly measured and recorded in signal storage unit 30. The same procedure is repeated for all desired depth levels in the borehole, to thereby store in unit 30 the desired sequence of vertical seismic profiling measurements from borehole 14 in vector form.

Figure 2:
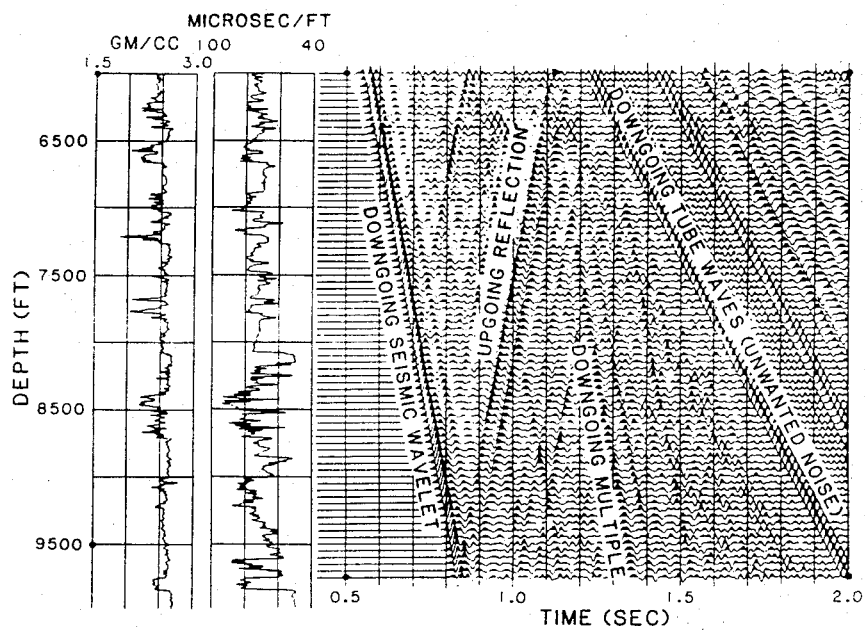
FIG. 2 illustrates a conventional record of vertical seismic profiling measurements.

The VSP measurements in storage unit 30 can be used to produce a conventional VSP record on a time versus depth grid, such as illustrated in FIG. 2, where the vertical dimension is depth along the borehole, the horizontal dimension is time and the filled-in black areas indicate the amplitude of acoustic energy received by downhole geophones. The line designated "downgoing seismic wavelet" is made up of the measurements at successive depth levels in the borehole of seismic energy which is believed to have traveled downwardly from the seismic source to the geophones. As can be expected, the further down the geophones are, the more time it takes for the seismic signal to reach them. The line labeled "upgoing reflection" slopes in the opposite direction and is assumed to be the result of acoustic energy which has traveled down to a reflector at the bottom of the measured borehole depth interval, has been reflected thereby and has reached the geophones after traveling up through the formation. A line labeled "downgoing multiple" suggests the measurement of energy which has traveled down to a reflector, up to another reflector, then down again to the geophones. The line labeled "downgoing tube waves" suggests measurements of the energy which has propagated down the borehole fluid.

Figure 3A:
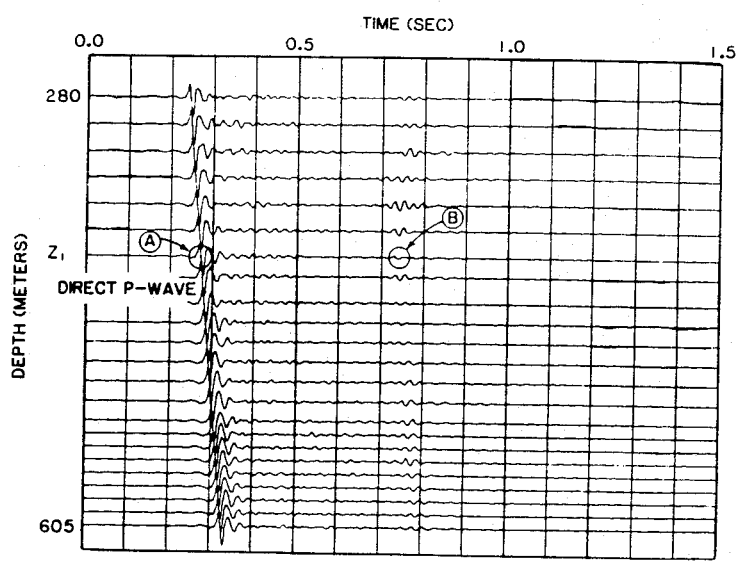
FIGS. 3a and 3b illustrate certain known attempts to separate compressional and shear components.
Figure 3B:
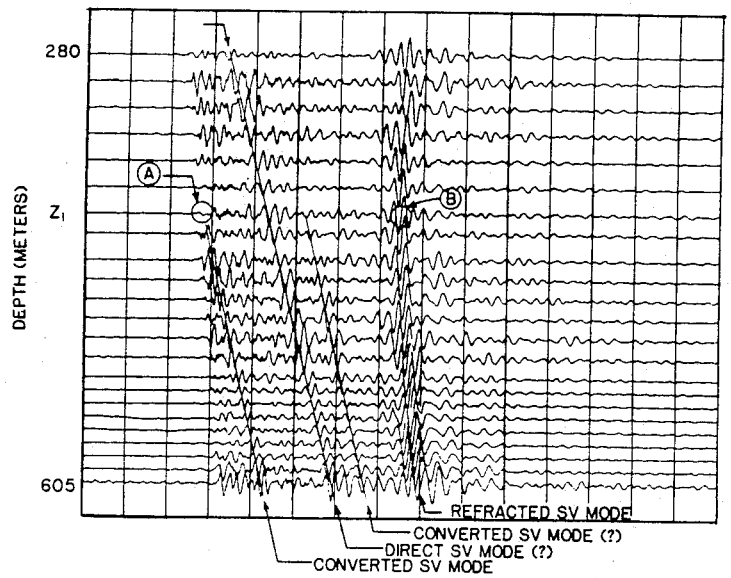

As earlier mentioned, VSP measurements recorded with a triaxial geophone system can be mathematically rotated in space to emphasize selected wave modes. In principle, if a single, elastic wave crosses an array of seismic receivers along a borehole in a homogeneous, isotropic medium, then the particles at the borehole will vibrate in the direction of travel of the wave if it is a P wave and in a direction normal to that direction if it is an S wave. With a 3-component tool, all that would have to be done in such a case is to determine the wave's direction of travel and compare it with the direction of measured particle motion. If the P and S wave velocities in the medium are known, and if it is assumed that the wave travels in the source-borehole plane, the wave direction can be found from the arrival times of the wave at the different receivers along the borehole. As an example of a prior art approach believed based on such considerations, FIG. 3a illustrates a record of particle velocity motion oriented (through mathematical rotation of the 3-component data) along the raypath associated with the compressional wave first arrival. Such particle motion is associated with downgoing compressional wave first arrivals and downgoing compressional waves multiples generated in the shallow part of the stratigraphic section. Through similar mathematical rotation, FIG. 3b illustrates particle motion normal to the compressional wave raypath and lying in the vertical plane containing the compressional wave raypath, so as to emphasize downgoing shear velocity events. However, difficulties arise when the medium in which the receivers (geophones) lie is not sufficiently homogeneous and when several seismic waves cross the receiver array simultaneously—both of which normally occur in VSP. Thus, it is believed that in the typical complex subsurface environment, and particularly where converted compressional and shear modes are present, mathematical rotation of the type illustrated in FIGS. 3a and 3b may not reliably separate compressional and shear events. It is also believed that in such cases those events may not be separated reliably by the earlier mentioned technique discussed, e.g., at pages 177-182 of the Hardage document.

In contrast with the proposals discussed above, this invention makes use of the unexpected discovery that, given certain assumptions and certain knowledge from other sources, each of the compressional and shear components can be satisfactorily related analytically to the wavefield measured in the borehole 3-dimensionally (or at least in the two dimensions of the source-borehole plane, more precisely, the plane defined by the source and the borehole axis).

A first particular and nonlimiting example of separation in accordance with the invention can be described mathematically as follows. Let $u(x-0.2.1)=[u_x,u]^T$ stand for the vector wavefield measured at the borehole, with component $u_z$ along the borehole and $u_x$ perpendicular to the borehole but in the source-borehole plane. Then the compressional $u^{(p)}$ and shear $u^{(sv)}$ components of u can be determined approximately by the following expressions (Note that $u^{(p)}$ and $u^{(sv)}$ are also vectors, since P-waves and SV-waves induce particle motions along both the x and z axes).

$$u^{(p)}(x=0,z,t) = \tag{1a}$$

$$\frac{1}{(2\pi)^2} \int_{-\infty}^{\infty} d\omega \int_{-\infty}^{\infty} dK\, J \cdot u(x=0,K,\omega)\, e^{i(Kz-\omega t)},$$

$$u^{(sv)}(x=0,z,t) = \tag{1b}$$

$$\frac{1}{(2\pi)^2} \int_{-\infty}^{\infty} d\omega \int_{-\infty}^{\infty} dK(I-J) \cdot u(x=0,K,\omega)\, e^{i(kz-\omega t)}.$$

Here $\bar{u}(x=0,K,\omega)$ denotes the two-fold Fourier transform of the total field, viz., $$u(x=0,K,\omega) = \int_{-\infty}^{\infty} dz \int_{-\infty}^{\infty} dt\, u(x=0,z,t)\, e^{-1(Kz-\omega t)}, \tag{2}$$

I is the 2×2 identity matrix, and $\hat{J}$ is the 2×2 matrix filter $$J = \begin{bmatrix} J_{xx} & J_{xz} \\ J_{zx} & J_{zz} \end{bmatrix}, \tag{3}$$

with components $$J_{xx} = \frac{\left(\frac{\omega^2}{V_p^2}-K^2\right)^{\frac{1}{2}}\left(\frac{\omega^2}{V_s^2}-K^2\right)^{\frac{1}{2}}}{K^2+\left(\frac{\omega^2}{V_p^2}-K^2\right)^{\frac{1}{2}}\left(\frac{\omega^2}{V_s^2}-K^2\right)^{\frac{1}{2}}}, \tag{3a}$$

$$J_{xz} = \frac{\left(\frac{\omega^2}{V_p^2}-K^2\right)^{\frac{1}{2}} K}{K^2+\left(\frac{\omega^2}{V_p^2}-K^2\right)^{\frac{1}{2}}\left(\frac{\omega^2}{V_s^2}-K^2\right)^{\frac{1}{2}}}, \tag{3b}$$

$$J_{zx} = \frac{K\left(\frac{\omega^2}{V_s^2}-K^2\right)^{\frac{1}{2}}}{K^2+\left(\frac{\omega^2}{V_p^2}-K^2\right)^{\frac{1}{2}}\left(\frac{\omega^2}{V_s^2}-K^2\right)^{\frac{1}{2}}}, \tag{3c}$$

$$J_{zz} = \frac{K^2}{K^2+\left(\frac{\omega^2}{V_p^2}-K^2\right)^{\frac{1}{2}}\left(\frac{\omega^2}{V_s^2}-K^2\right)^{\frac{1}{2}}}, \tag{3d}$$

if $|K| < \frac{\omega}{V_p}$ and $$J_{xx} = J_{xz} = J_{zx} = J_{zz} = 0 \tag{3e}$$

-continued $$\text{if } |K| \geq \frac{\omega}{V_p}.$$

In expressions (1a)–(3e), K is the wavenumber and omega is frequency, $V_p$ is compressional velocity in the region from which the u measurements being processed were derived, and $V_s$ is the shear velocity in the same region. These regional (or local) velocities can be estimated from, for example, sonic logs one of which uses a compressional wave source and another a shear wave source. As an alternative, they can be estimated from the original VSP measurements, using, for example, known semblance processing techniques.

The filter $\hat{J}$ is a representation of the means used to decompose the total measured vector wavefield into its local plane-wave components. Operating in the Fourier transform space of expression (1a), it helps identify plane compressional waves and the shear waves can then be determined, as expression (1b) shows, by subtracting the compressional component from the total field. As the filter depends on the local compressional and shear velocities in the subsurface region where the separation is performed at the time, the process, although linear, is not space-invariant. To process the typical complete seismic profile, it is necessary to process separately each substantially homogeneous zone, with the filter $\hat{J}$ varying from zone to zone.

Referring again to FIG. 1, for an overview of the process of separating the compressional and shear components in accordance with the relationships discussed above, unit 32 performs a forward fast Fourier transform on the vector measurements for several contiguous depth levels in the borehole. For example, the initial subset processed in unit 32 can be made up of the fifth depth level from the bottom up and the four levels below and four levels above, the next subset can be made up of the sixth depth level from the bottom up and the four below and four above it, etc. The result of processing one such subset by unit 32, for example the subset centered at the fifth depth level from the bottom up, is supplied to unit 38 which performs a vector dot product operation by using a filter $\hat{J}(K,\omega)$ derived at unit 36 (in accordance with the relationship discussed above) from an acoustic log of borehole 12 stored in unit 34. Unit 40 then performs a two-dimensional inverse fast Fourier transformation of the dot product from unit 34, to thereby derive the compressional wave component of the vector measurement at the central depth level for the subset being processed, and stores it in unit 42. Unit 44 then subtracts this compressional component from the total vector measurement for the current depth level being processed (the central level of the current subset), to thereby derive the shear component for the depth level of interest, and stores it in unit 46. The operations performed by units 32, 38, 40, 42, 44 and 46 are then repeated for successive subsets by stepping up the interval of interest one depth level at a time, until the borehole depth interval of interest has been so processed. Units 42 and 46 then store, respectively, the compressional and the shear components of the total measured vector wavefield as functions of borehole depth. These components are supplied to utilization equipment 48, which can comprise equipment producing records of the type illustrated in FIGS. 3a and 3b, and/or other equipment for processing the estimates of compressional and shear components stored in units 42 and 46.

In practice, the principles discussed above can be implemented in a process the major steps of which are illustrated in FIG. 4, where step 40a illustrates the derivation and storage of the total wave measurements for the borehole depth interval of interest. Referring to FIG. 5 for an illustration, the elastic wave source of the seismic wave and the borehole axis are in the same plane, and axis x is also in the same plane. Each total wave measurement is taken at a given depth level in the borehole, and the geophone array produces a vector set having components in each of the three directions illustrated in FIG. 5. Two of these directions may but need not coincide with the x and z direction in the borehole-source plane. A vector set of measurements is taken at each of a number of borehole depths, typically spaced from each other by a distance of the order of meters or tens of meters, from a bottom depth at $z_l$ to a top depth of $z_N$. Returning to FIG. 4, at step 42a each of the vector sets of measurements is subjected to a coordinate rotation to find its component along the x axis and its component along the z axis illustrated in FIG. 5. The component in the direction perpendicular to the plane of FIG. 5 is not used in the remainder of the process, and need not be found. At step 44a the depth index z is set at a starting level which is N depth levels up from the lowermost measurement in the borehole, and at step 46a a subset of rotated measurements is selected which is centered at the depth level z selected at step 44a and includes N measurement sets above and N measurement sets below the depth level z. Referring to the lefthand portion of FIG. 6 for an illustration, the relevant subset of measurements $u_x$ is illustrated as a total of nine traces centered at depth level z and varying in time as illustrated. The subset of measurements for the energy along the z axis can be illustrated in the same manner.

In order to convert the subset identified at step 46a to measurements in wavenumber-frequency space, the process at step 48a finds the one-dimensional discrete form of the Fourier transform of the subset in a procedure described by expressions (4a) and (4b):

$$\tilde{u}_x(x = 0, K_n, t) = \sum_{j=0}^{2N} u_x(x = 0, z_j, t) e^{-iK_n z_j} \quad (4a)$$

$$\tilde{u}_z(x = 0, K_n, t) = \sum_{j=0}^{2N} u_z(x = 0, z_j, t) e^{-iK_n z_j} \quad (4b)$$

Referring to FIG. 6 for an illustration, the spatial domain traces within the window illustrated in the lefthand part of the figure are converted at step 48a to the Fourier domain traces illustrated within the window shown at the righthand side of the figure. In view of the discrete nature of the transformation process, the spatial domain traces are sampled at each of sample times j over a time interval made up of J samples, at a sampling frequency sufficient to satisfy the Nyquist requirements and over a total time interval sufficient to include the arrival of the seismic wavefield of interest, and the Fourier domain traces are also expressed in the form of a corresponding number of samples. Although the same symbol is used for the total number of samples in each domain, this is not necessary and the total number of samples in the Fourier domain may be less than that in the spatial domain, for example it can be 64 or 128.

Returning to FIG. 4, at step 50 the process uses the quantities found in step 48a to carry out another one-dimensional Fourier transformation in discrete form as described by expressions (5a) and (5b) to complete the transformation of the spatial domain measurements into wavenumber-frequency measurements:

$$\bar{\bar{u}}_x(x=0, K_n, \omega_m) = \sum_{j=0}^{J} \bar{\bar{u}}_x(x=0, K_n, t_j) e^{i\omega_m t_j} \quad (5a)$$

$$\bar{\bar{u}}_z(x=0, K_n, \omega_m) = \sum_{j=0}^{J} \bar{\bar{u}}_z(x=0, K_n, t_j) e^{i\omega_m t_j} \quad (5b)$$

At this time the process is ready to make use of the previously discussed filter.

The filter of interest can be derived from sonic logs of the same borehole which provide estimates of the compressional and shear velocities of the formation adjacent the borehole (although by using sonic frequencies much higher than that of the sesmic source used in VSP). To this end the process illustrated in FIG. 4 stores the sonic logs of interest at step 52 and, if they are in a form other than directly in units of compressional and shear velocity, converts them at step 54 into such form for the borehole depth interval corresponding to that of the measurements stored at step 40. At step 56 the compressional and shear velocity logs are zoned such that only one filter $\hat{J}$ would have to be estimated for each subsurface zone which is substantially homogeneous for the purposes of this process. Referring to FIG. 7 for an illustration, the lefthand part illustrates the amplitude variations with depth of compressional velocity (or shear velocity), and the right hand part illustrates the same velocity log after zoning it such that it has a constant value within each borehole depth interval which can be considered homogeneous for the purposes of this process. As one nonlimiting example, a zone can be considered homogeneous if the measured velocities are within a band of some percentage, e.g., 20%, of the average, with only a small minority of reasonably well dispersed excursions outside the band. Relevant considerations of zoning techniques are discussed in U.S. patent application Ser. No. 333,446 filed Dec. 22, 1981 (now U.S. Pat. No. 4,486,836) and assigned to the same assignee as this application, which is hereby incorporated by reference. The result of the zoning process carried out at step 56 is used at step 58 to find, for each zone, the four matrix elements identified in expression (3), by carrying out the processes described by expressions (3a)–(3e), for each omega and K value used in the conversion into wavenumber-frequency space carried out at steps 48 and 50. The result of the process at step 58 is a respective value of the matrix filter for each of the zones identified in step 56.

At step 60, the subset of VSP measurements in wavenumber-frequency form and the filter for the borehole depth zone which corresponds to the depths at which the VSP measurements currently being processed were derived, are used to find the compressional component of the total wavefield, by carrying out a process described in expressions (6), (7a) and (7b):

$$u^{(p)}(x=0,z,t) = \begin{bmatrix} u_x^p(x=0,z,t) \\ u_z^p(x=0,z,t) \end{bmatrix} = \quad (6)$$

-continued $$= \frac{1}{(2\pi)^2} \int\int d\omega dk \begin{bmatrix} J_{xx} & J_{xz} \\ J_{zx} & J_{zz} \end{bmatrix} \begin{bmatrix} u_x(x=0,K,\omega) \\ u_z(z=0,K,\omega) \end{bmatrix} e^{i(Kz-\omega t)}$$

$$u_x^p = \frac{1}{(2\pi)^2} \int\int d\omega dK [J_{xx}u_x + J_{xz}u_z] e^{i(Kz-\omega t)} \quad (7a)$$

$$u_z^p = \frac{1}{(2\pi)^2} \int\int d\omega dK [J_{zx}u_x + J_{zz}u_z] e^{i(Kz-\omega t)} \quad (7b)$$

These expressions are in integral form, for simplicity of illustration, but it should be clear that in practice they are carried out in discrete form in the same manner as discussed in connection with expressions (4a)–(5b). As indicated by expression (6), the compressional component is a vector quantity having a component along the x direction (see FIG. 5) and a component along the z direction. These two components of the compressional wave vector component are found individually through the process illustrated by expressions (7a) and (7b) but, as earlier noted, in discrete form, and are stored at step 60. At step 62 the current median depth level of the subset being processed is incremented by one depth level, to bring it to the next point up the borehole at which VSP measurements were taken, and at step 64 a check is made to see if this has brought the depth interval defined by the subset to be processed up to the top of the borehole interval of interest. If not, the process returns to step 46 to process the new subset in the same manner. If yes, the process goes to step 66, and for each depth level for which a compressional component was found, subtracts the compressional component from the total wavefield component to thereby estimate the shear wave component, and thereby derive, for each such depth level, a shear vector component defined by the components in the x and z directions illustrated in FIG. 5. At step 68 the compressional and/or shear vector components are stored and/or used as earlier discussed, and the process ends.

Figure 8:
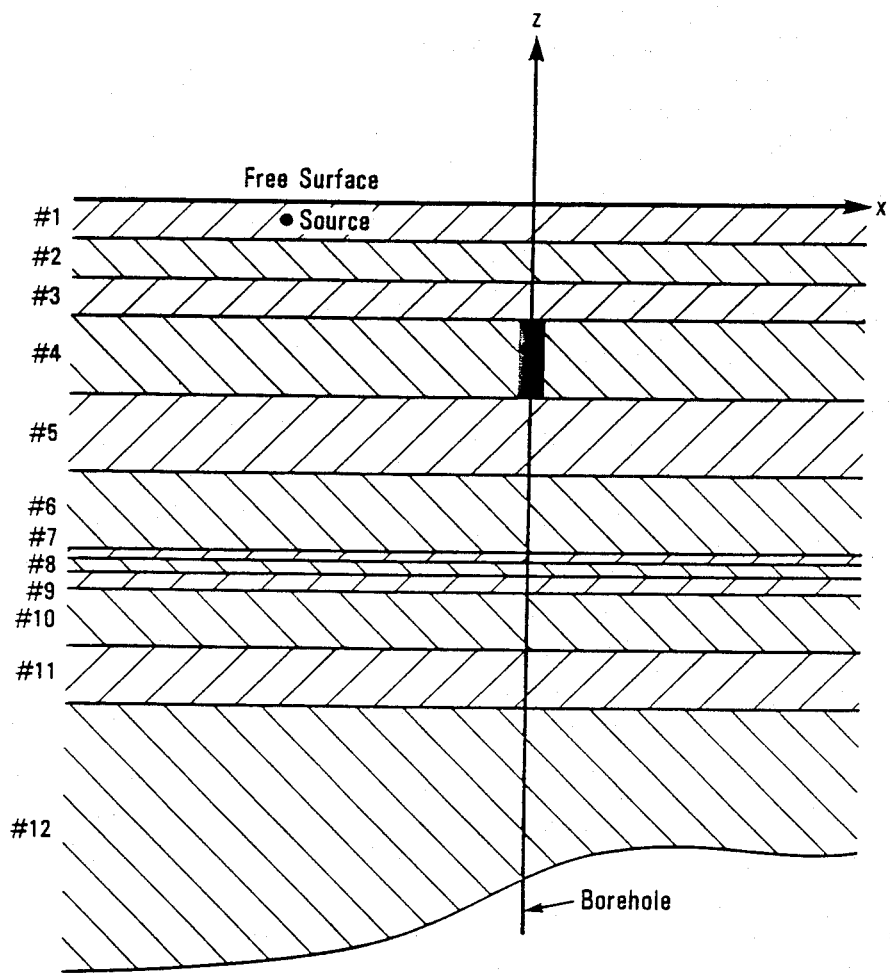
FIG. 8 illustrates a layered subsurface formation model for VSP measurements.
Figure 9:
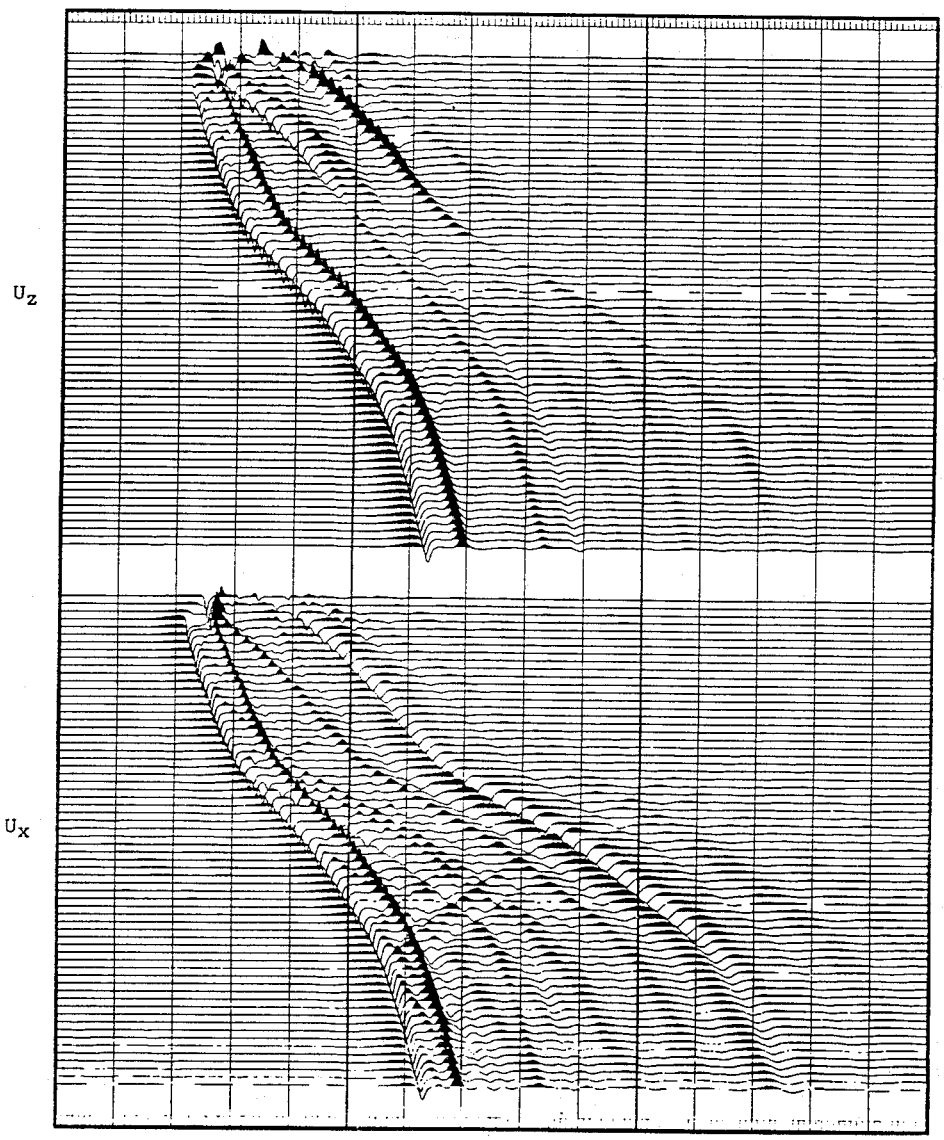
FIG. 9 illustrates VSP measurements which would be made in a formation such as that shown in FIG. 8: the top part of FIG. 9 shows the z component of the total wavefield and the bottom part the x component.

FIGS. 8–11 and Table 1 illustrate applying the process described above in a setting illustrative of a subsurface model which is shown in FIG. 8 and is made up of layers 1 through 12 each of which can be considered homogeneous. The thickness and compressional and shear wave speeds of each layer are given in Table 1 below: the blocked area along the borehole axis (in layer 4 in FIG. 8) indicates the section in which P wave separation was performed in accordance with the process described above. FIG. 9 illustrates in its top half the z component of the total wavefield along the borehole axis, where the borehole axis is vertical and the time axis is horizontal. The top trace is from a depth of 30 meters in the borehole, and spacing between traces is 20 meters. The vertical time lines are at 0.1 second intervals. The bottom half of FIG. 9 shows the x component of the total wavefield along borehole axis on scale corresponding to the top half. The data shown in FIG. 9 were derived by determining through a known process what the measured wavefield should be, given the formation described by the parameters in Table 1 below, and assuming that the point source of the seismic signal was located 30 meters below the free surface and 250 meters from the borehole.

TABLE 1

| Layer | Thickness (m) | $V_p$ (m/s) | $V_s$ (m/s) |
|---|---|---|---|
| 1 | 100 | 1000 | 534.5 |

TABLE 1-continued

| Layer | Thickness (m) | $V_p$ (m/s) | $V_s$ (m/s) |
|---|---|---|---|
| 2 | 100 | 1500 | 801.8 |
| 3 | 100 | 1750 | 935.4 |
| 4 | 200 | 2250 | 1203 |
| 5 | 200 | 1500 | 801.8 |
| 6 | 200 | 2000 | 1069 |
| 7 | 20 | 2500 | 1336 |
| 8 | 30 | 3000 | 1604 |
| 9 | 50 | 2750 | 1470 |
| 10 | 150 | 4000 | 2138 |
| 11 | 150 | 5000 | 2673 |
| 12 | ∞ | 5500 | 2940 |

The slopes of the curves in FIG. 9 can give a rough indication of whether a given arrival is compressional or shear: steep slopes are believed to generally indicate P wave arrivals and gentle slopes S wave arrivals.

Figure 10:
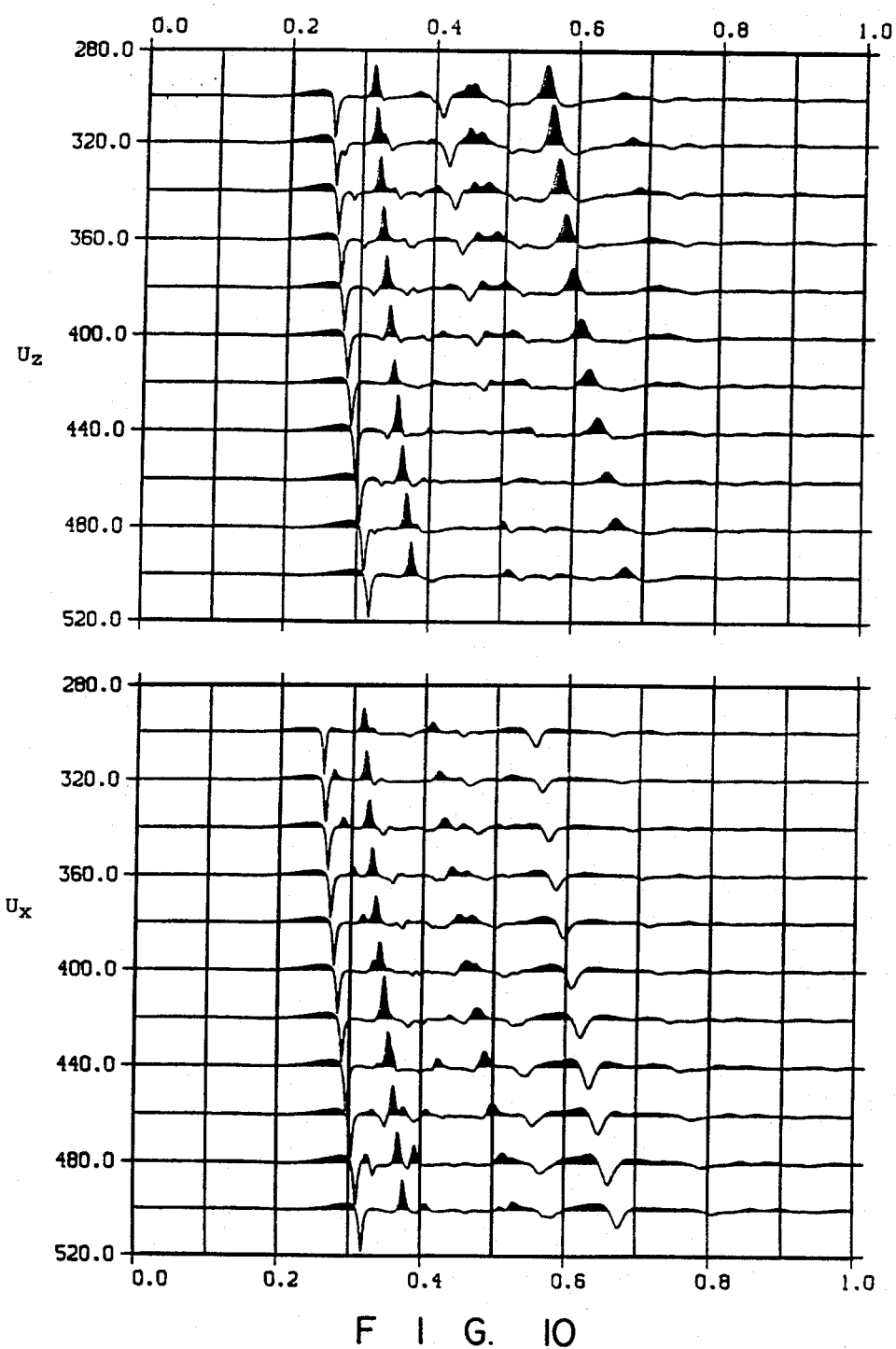
FIG. 10 shows in greater detail the portion of FIG. 9 which corresponds to layer 4 in FIG. 8.

Referring to FIG. 10, the top and the bottom halves show, respectively, the z and x components of the total velocity field within the fourth layer (where the separation was performed), again with the vertical axis being borehole depth and the horizontal axis being time.

Figure 11:
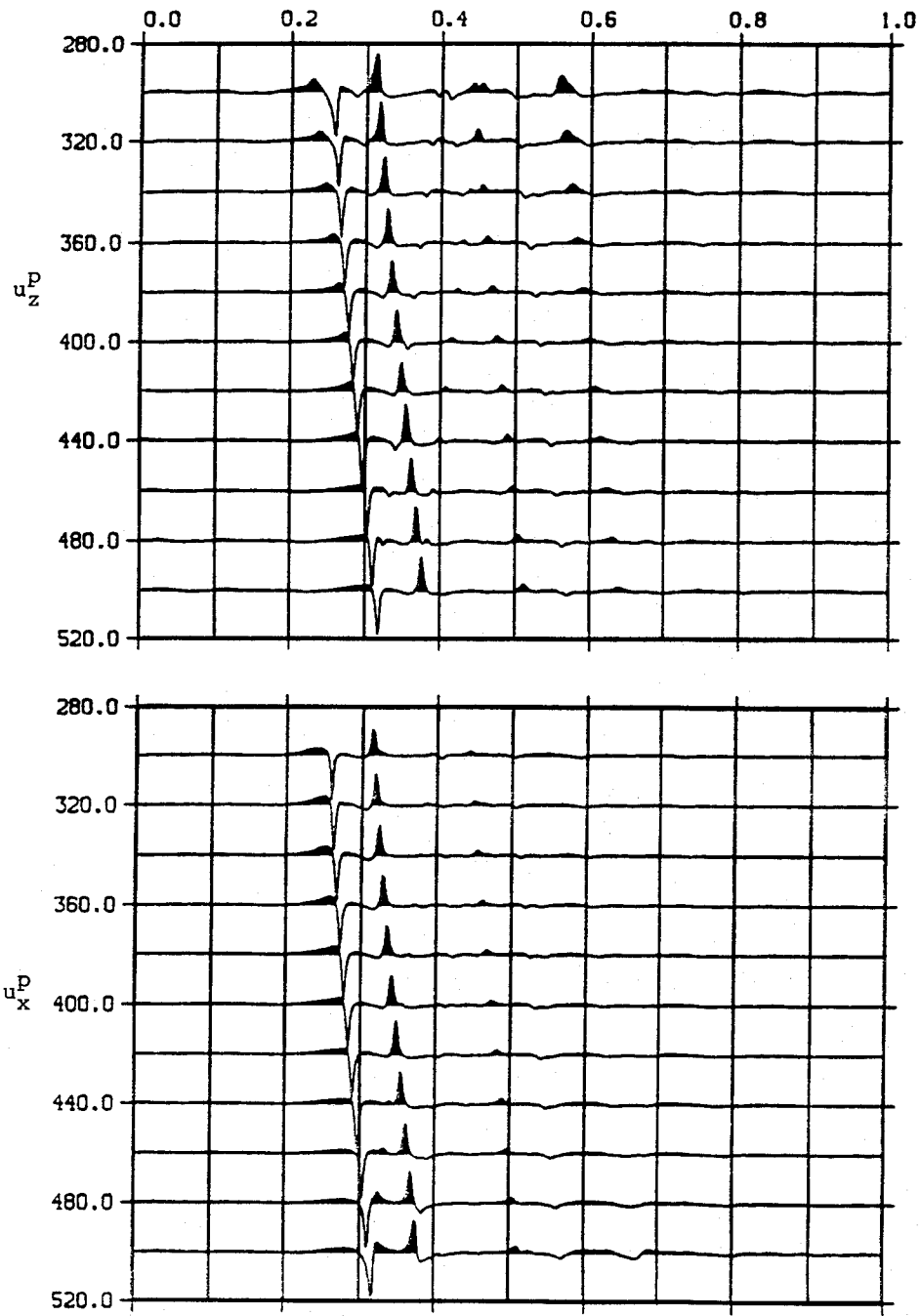
FIG. 11 shows the compressional components of the waveforms illustrated in FIG. 10, derived in accordance with an embodiment of the invention.

FIG. 11 illustrates the z and x component of the compressional wave in the fourth layer as estimated in accordance with the process described above, and illustrates the removal of the gently sloping arrivals (probably shear arrivals) from the total field. The so separated compressional component can be used for further processing and interpretation, such as the estimation of arrival time and the separation of upgoing and downgoing waves, as well as for the other end uses earlier discussed.

While the process has been described above as using certain steps performed in wavenumber-frequency space, the corresponding process can be carried out, in the alternative, strictly in the spatial domain. Referring to FIG. 12 for a brief illustration, the process again starts, at step 70, with deriving and storing the same total wave measurements discussed in connection with step 40 in FIG. 4. At step 72 in FIG. 12 these measurements are subjected to a slant stack procedure of the type discussed in Chapman, C. H., Generalized Radon Transforms and Slant Stacks, Geophys. J. R. ASTR. Soc. (1981), 66, 445-453, hereby incorporated by reference. The result of slant stacking is, for each depth level, the quantity indicated at step 74, which has a component along the x axis (FIG. 5) and a component along the z axis, described in integral form by expressions (8a) and (8b):

$$U_x(p,t) = \int_{-\infty}^{+\infty} dz\, u_x(z, \tau + pz) \quad (8a)$$

$$U_z(p,t) = \int_{-\infty}^{+\infty} dz\, u_z(z, \tau + pz) \quad (8b)$$

Expression (8a) is shown in discrete form in expression (9a), and a corresponding discrete form expression (not shown) is used to represent the relationship of (8b):

$$U_x(p_n, t_m) = \Delta z \sum_{j=-J/2}^{+J/2} u_x(j\Delta z, \tau_m + p_n \Delta z) \quad (9a)$$

Step 72 is a process described by the discrete forms of expressions (8a) and (8b), and is performed on successive subsets of VSP measurements, in a manner similar to that discussed in connection with step 46 in FIG. 4. The type of subset used in step 72 is illustrated in FIG. 13, which shows the relevant notations (the subscripts n, m and p are indices identifying trace samples which, for the window of interest, total, respectively, N, M and P). At step 76 in FIG. 12, a filter is applied in the spatial domain to derive and store for each subset of VSP measurements the vector set indicated in step 78. This vector set comprises of a component along the x axis and a component along the z axis, and is derived in accordance with the discrete form of the relationship indicated in integral form in expression (10a) and discrete form in expression (10b), it being understood that corresponding expressions describe the component along the z axis.

In expressions (9a) and (10b) the delta z and delta tau symbols refer to the inter-sample distances of the respective measures. In expressions (10a) and (10b) the tau filter h can be, for example, the filter proposed in Shepp, L. A., et al. (1974), The Fourier Reconstruction of a Head Section, IEEE Trans. Nuclear Science NS-21(3), 2143, 96, which is hereby incorporated by reference. The results are subjected to p-filtering at step 80 to derive and store the vector sets indicated at step 82, each vector set in step 82 having x and z components described by the relationships (11a) and (11b), where the elements D of the filter are defined by expression (12):

$$\hat{U}_x(p,\tau) = \int_{-\infty}^{+\infty} d\tau'\, h(\tau - \tau')\, U_x(p,\tau') \quad (10a)$$

$$\hat{U}_x(p_n, \tau_m) = \Delta\tau \Sigma_{m'} h(\tau_m - \tau_{m'}) U_x(p, \tau_{m'}) \quad (10b)$$

$$\hat{U}_x^+(p,\tau) = D_{xx}(p)\hat{U}_x(p,t) + D_{xz}(p)\hat{U}_z(p,\tau) \quad (11a)$$

$$\hat{U}_x^+(p,\tau) = D_{zx}(p)\hat{U}_x(p,\tau) + D_{zz}(p)\hat{U}_z(p,\tau) \quad (11b)$$

$$D(p) = \begin{bmatrix} D_{xx}(p) & D_{xz}(p) \\ D_{zx}(p) & D_{zz}(p) \end{bmatrix} =$$

$$= \begin{bmatrix} \dfrac{(S_\alpha^2 - p^2)^{\frac{1}{2}}(S_\beta^2 - p^2)^{\frac{1}{2}}}{p^2 + (S_\alpha^2 - p^2)^{\frac{1}{2}}(S_\beta^2 - p^2)^{\frac{1}{2}}} & \dfrac{p(S_\alpha^2 - p^2)^{\frac{1}{2}}}{p^2 + (S_\alpha^2 - p^2)^{\frac{1}{2}}(S_\beta^2 - p^2)^{\frac{1}{2}}} \\ \dfrac{p(S_\beta^2 - p^2)^{\frac{1}{2}}}{p^2 + (S_\alpha^2 - p^2)^{\frac{1}{2}}(S_\beta^2 - p^2)^{\frac{1}{2}}} & \dfrac{p^2}{p^2 + (S_\alpha^2 - p^2)^{\frac{1}{2}}(S_\beta^2 - p^2)^{\frac{1}{2}}} \end{bmatrix}$$

$$S_\alpha = \frac{1}{V_p} \equiv \text{compressional slowness}$$

$$S_\beta = \frac{1}{V_s} \equiv \text{shear slowness} \quad (12)$$

The result is subjected to inverse slant stacking using a procedure of the type described in said Chapman publication, for example in accordance with the relationships described in integral form in expression (13a) and discrete form in expression (13b):

$$u_x^P(z,t) = \frac{1}{(2\pi)} \int_{-\infty}^{+\infty} dp\, \hat{U}_x^+ (p, t - pz) \quad (13a)$$

$$u_x^P(z,t) = \frac{1}{(2\pi)} \sum_{n=-N/2}^{N/2} U_x^+(p_n, t - p_n z)\Delta p \quad (13b)$$

The result is stored at step 86, in the form discussed earlier in connection with step 60 of FIG. 4, and can be used as earlier discussed.

It will be appreciated from the description above that the separation process can be conceptualized as treating the total wavefield arriving at a receiver location as being made up of a multiplicity of plane waves each of which propagates along its own direction in the borehole-source plane. Thus, one way of conceptualizing the filtering process described above is to consider it as decomposing the total local wavefield measured at a receiver location into local plane waves which are in the receiver-source plane. In the case of VSP, this plane is the borehole-source plane, and in the case of horizontal seismic profiling this plane includes a line of receivers and the source. In the case of a deviated borehole, this plane includes a reasonably straight interval of the borehole or the straight borehole defined by measurements synthesized from those taken along a deviated axis. Once the total local wavefield has been decomposed into such plane waves, the compressional and/or shear wave component of each local plane wave can be found by the polarization thereof, as the direction of propagation of each local plane wave is known from the decomposing process (the compressional component is that along the direction of propagation and the shear component is that normal to it in the plane of interest). Separately recombining the local plane waves' compressional or shear components gives the separated compressional and/or shear component of the total wavefield. The detailed description so far has discussed the first embodiment of the invention, in which a double Fourier transformation of the measurements is used, from the spacetime to the wavenumber-frequency space, and the filtering is done in the wavenumber-frequency space and the result is double-transformed back to the space-time domain, and the second embodiment, in which the equivalent operations are carried out entirely in the space-time domain. As earlier discussed, the third implementation of the invention pertains to a process particularly suited to cases in which the measurements are sparse, e.g. because the subsurface formations contain severely thin beds, and in an exemplary implementation of which only a single (temporal) transformation is used.

Figure 14:
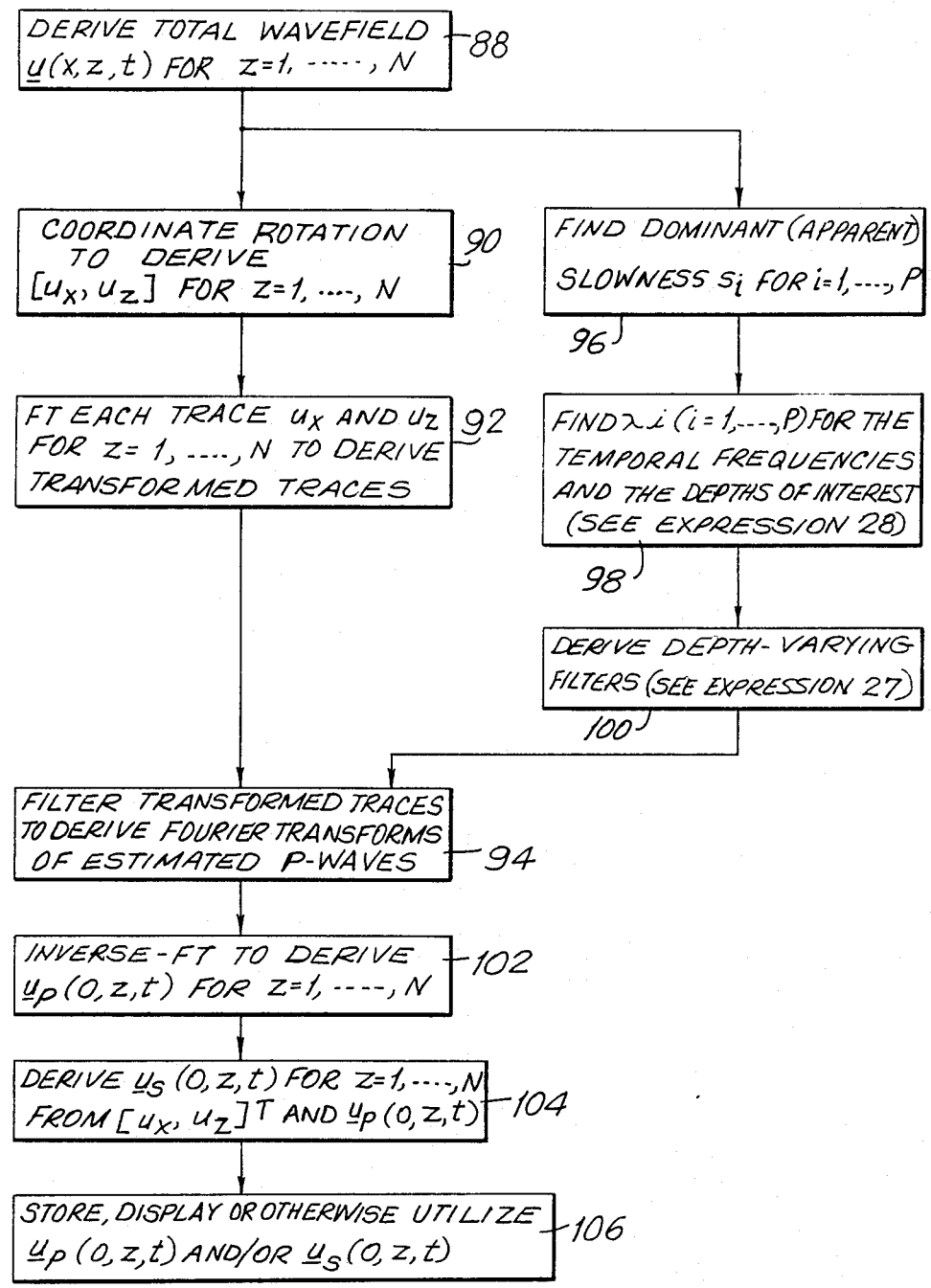
FIG. 14 is a flowchart illustrating main steps of a third embodiment of the invention in which a single (temporal) transformation is used.

FIG. 14 illustrates certain main steps of a particular and nonlimiting embodiment of the third implementation of the invention. In broad terms, the exemplary process sequence comprises Fourier transforming each waveform in time, processing the transform samples in the space-frequency domain at each temporal frequency independently with a shift-varying filter (also referred to as a depth-variant filter), reconstructing the compressional component in the space-frequency domain, and inverse transforming (in time) to obtain the reconstructed compressional component time waveforms in the space-time domain. These can be subtracted from the starting waveforms to obtain the reconstructed shear wave component in the space-time domain.

In step 88 in FIG. 14 the total wavefield is derived, e.g. with a three-component VSP tool in a borehole through the subsurface formations of interest, in a process corresponding to that discussed in connection with step 40a in FIG. 4. At step 90, the total wavefield measurements are processed through a coordinate rotation to derive for each depth level z a local wavefield component in the horizontal direction x and a local wavefield component in the vertical direction z. This step corresponds to the process at step 42a in FIG. 4. Each local wavefield component at this stage is in the space-time domain, and can be thought of as a trace made up of samples of the local wavefield in the relevant direction, where each sample corresponds to a respective instant in time. Such traces for the horizontal direction are illustrated in the left-hand side of FIG. 6, and the traces for the vertical direction can be illustrated by similar curves. At step 92 in FIG. 14 each of the traces derived in step 90 is subjected to a one-dimensional Fourier transformation (in time) to derive a respective trace which is a function of temporal frequencies n, and thus can be thought of as being in the space-frequency domain. The requisite transformation can be carried out in any convenient way, e.g. by using commercially available FFT processors. As should be apparent to those skilled in the art, the temporal frequencies are chosen in accordance with the the nature of the seismic signals being processed such that the seismic information would be preserved to the extent possible, given the practical constraints of processing time and equipment. As a result of step 92, for each depth level z in the borehole there is a pair of transformed traces, i.e., a trace in the space-frequency domain for the vertical local wavefield component and another trace for the horizontal local wavefield component. Again, each of these traces is represented by a set of samples, each sample corresponding to a particular selected temporal frequency n for a particular depth level. As usual, the index is an integer, and ranges from 1 to N.

In order to commence separating the local components of the compressional waves, at step 94 the traces in space-frequency domain derived at step 92 are filtered with a shift-variant filter. The filtering is done in the space-frequency domain, and is carried out independently for each temporal frequency.

This filtering can be conceptualized as a process in which the process removes (to the extent possible) from the wavefield measured at a given level in the borehole all influences other than that of the compressional wave component which would have been measured at that depth level if it were possible to directly take such a measurement. Of course, because of the complexity of the problem, the local compressional wave component which is found through this process is only an estimate.

The requisite shift-variant filter is in fact a set of filters each corresponding to a particular depth level in the borehole. It is thus tailored to the specific conditions existing at each respective depth level. It can be derived, in one example of the invention, in conformance with local estimates of dominant seismic velocities (slownesses) at the respective depth levels in the borehole, which in turn can be derived from the total wavefield derived in step 88 of the process in FIG. 14. As one example, the dominant slownesses can be estimated at step 96 from the total wavefield measured at step 88 by using known semblance processing to find, for each depth level in the borehole, the slowness of the one or more dominant seismic wavefield arrivals. One example of such semblance processing is discussed in Kimball, C. V. and Marzetta, T. L., "Semblance Processing of Borehole Acoustic Array Data," Geophysics, V. 49, No. 3, pp. 274-281, 1984. The cited article is hereby incorporated by reference in this specification. Step 98 uses the slownesses found at step 96 and the respective temporal frequencies of interest to find the quantities lambda, for example in accordance with expression (28) discussed below. Expression (12) can be solved, for example, by a conventional machine-implemented technique for solving linear systems of equations. The temporal frequencies of interest are those used to represent the traces in the space-frequency domain derived in step 92.

The depth of interest is the depth level in the borehole which is currently being processed, and for which a filter is being derived in accordance with the local estimates of slowness. At step 100 the requisite shift-variant filter for each required depth level in the borehole is found, for example in accordance with expression (27) discussed below, and is supplied to step 94. The product of step 94 is a set of samples in the space-frequency domain, where each sample corresponds to a particular temporal frequency and a particular depth level in the borehole. The samples for a particular depth level are combined to form a filtered trace for that depth level, and this is repeated for all depth levels of interest. At step 102 the resulting filtered traces are inverse transformed, from the space-frequency domain to the space-time domain, e.g. by using commercially available FFT equipment, to derive for each respective depth level in the borehole a trace which is an estimate of the local component of the compressional wave at that depth level. At step 104 the local shear wave component for each respective depth level in the borehole is found by subtracting the compressional component for that level from the total wavefield measured at that level (in the x,z plane). Again, this is an estimate of the local shear wave component. At step 106 the local compressional and/or shear wave components are stored, displayed, or otherwise utilized, e.g., in other processes for exploring subsurface formations which require estimates of the compressional and/or shear wave components.

Figure 15A:
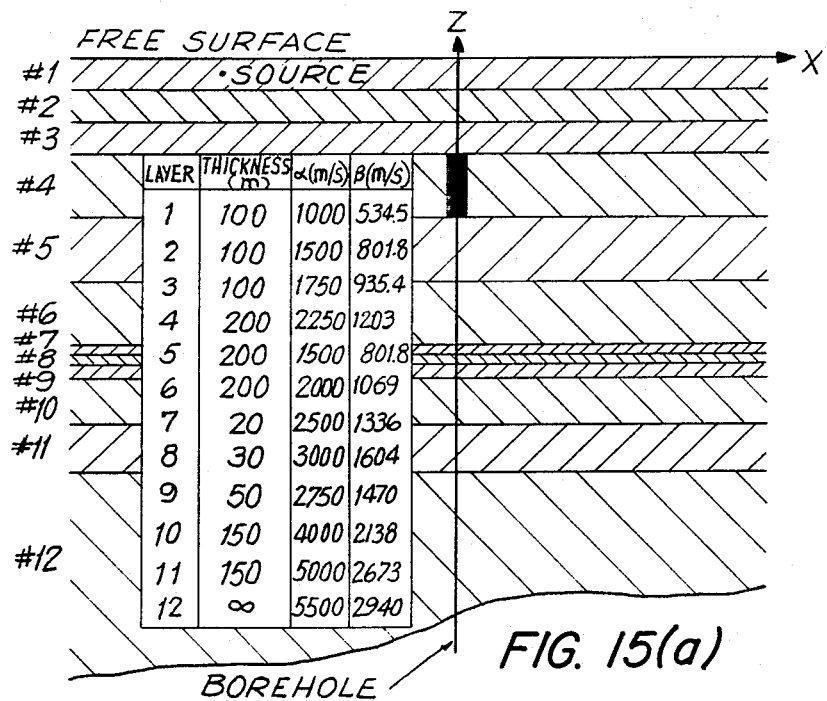
FIG. 15a illustrates a subsurface formation which includes a layer 4.
Figures 15B, 15C:
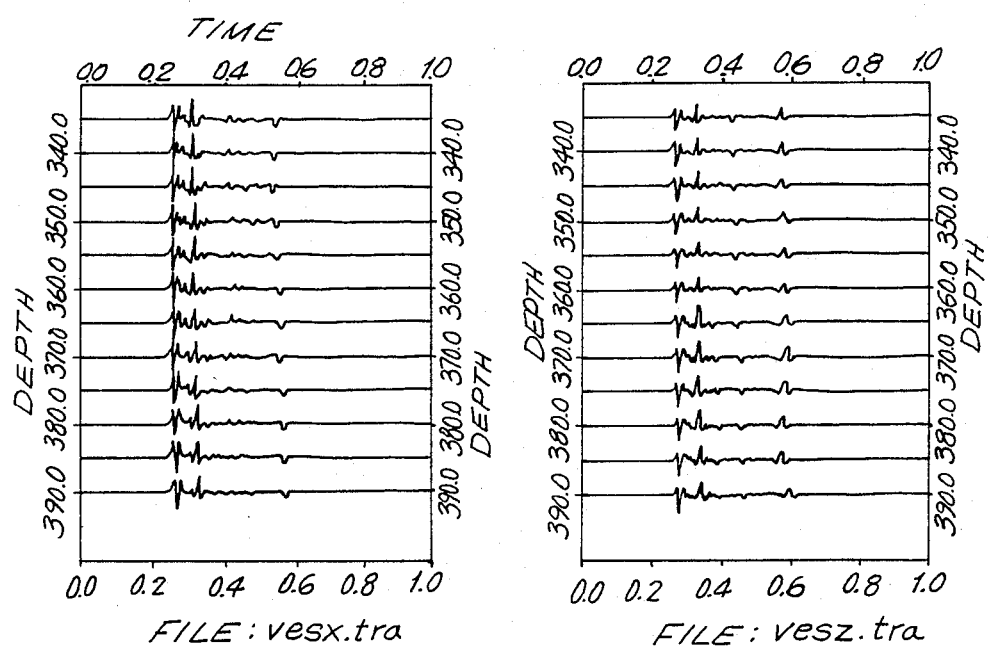
FIG. 15b illustrates local estimates of horizontal components of seismic energy measured in layer 4.
FIG. 15c illustrates estimates of vertical local components measured in the same layer.
Figure 16A:
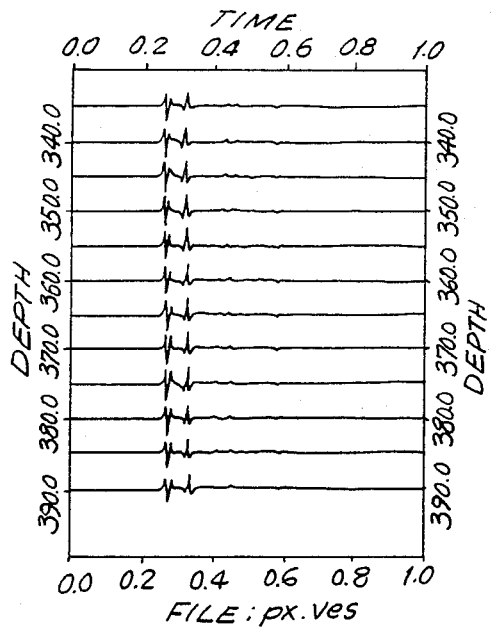
FIG. 16a illustrates estimates of the horizontal component of the local compressional energy in layer 4 estimated in accordance with one embodiment of the invention.
Figure 16B:
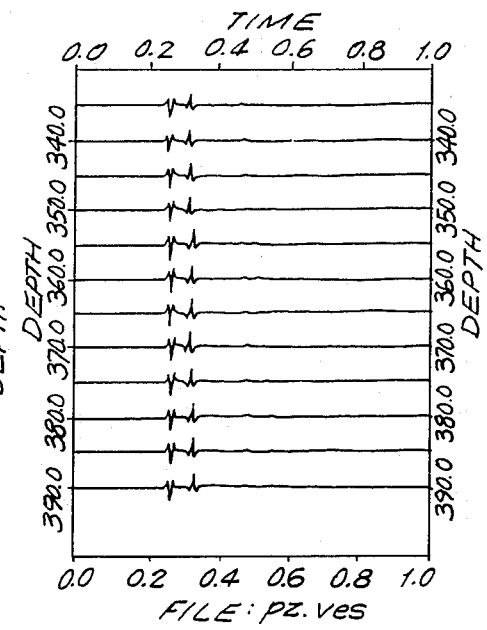
FIG. 16b illustrates estimates of the vertical component of the compressional wave energy.
Figure 16C:
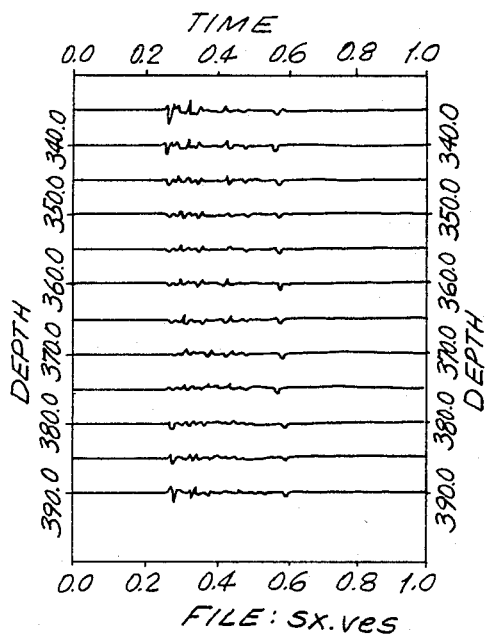
FIG. 16c illustrates the horizontal component of the estimated shear wave energy.
Figure 16D:
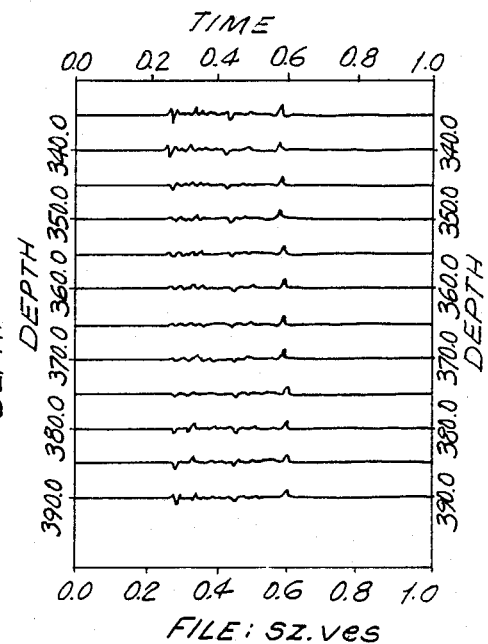
FIG. 16d illustrates the estimated vertical component of the shear wave energy.
Figure 17A:
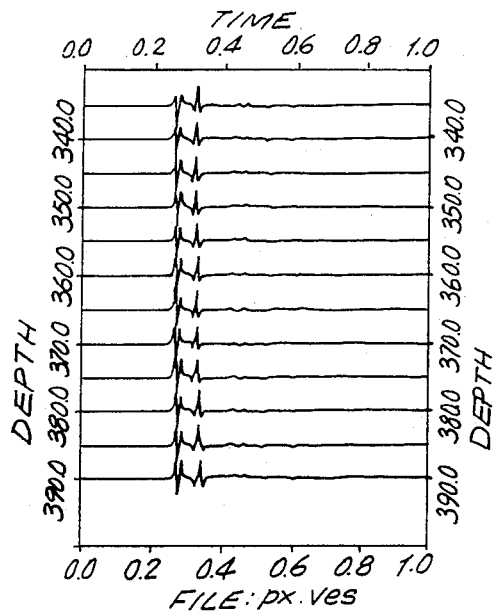
FIGS. 17a, b, c, & d correspond to FIGS. 16a–16d but are derived in accordance with another embodiment of the invention.
Figure 17B:
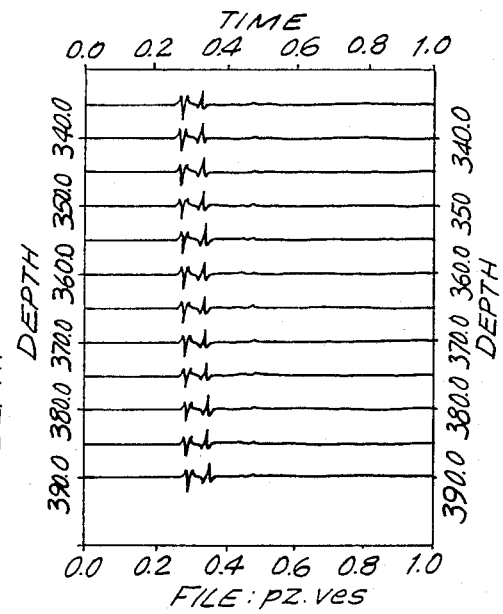
Figure 17C:
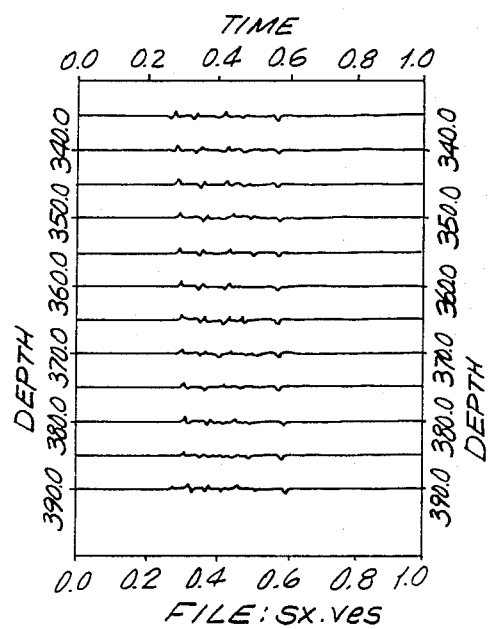
Figure 17D:
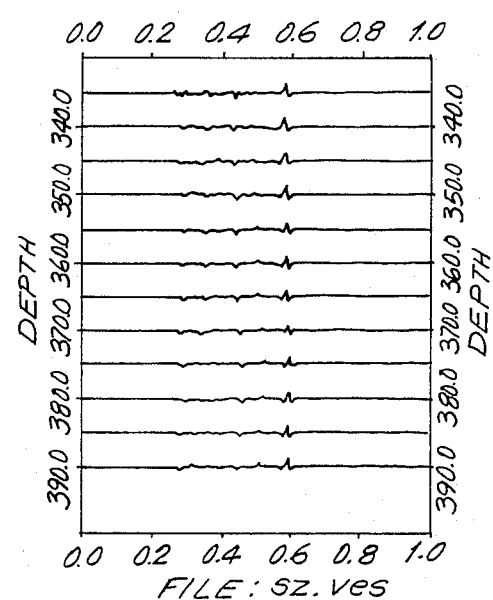

One example of applying the first and third implementations of the invention to the VSP measurements discussed in connection with FIG. 8 and Table I, is illustrated in FIGS. 15a-17d. FIG. 15a is the same as FIG. 8 and points out that layer number 4 is under consideration. FIG. 15b illustrates the traces for the local wavefield components in the horizontal direction of layer 4, and FIG. 15c illustrates the traces for the vertical direction. FIG. 15d illustrates that conventional analysis of the x component reveals the presence of three predominant slownesses, corresponding to three predominant velocities of which two travel downward and one upward. FIGS. 16a-16d illustrate the estimates of the local components of the compressional and shear waves derived in accordance with the first implementation of the invention. FIG. 16a shows the traces for the horizontal component of the compressional wave and FIG. 16b shows the traces for the vertical component of the compressional wave, while FIG. 16c shows the traces for the horizontal component of the shear wave and FIG. 16d shows the traces for the vertical component of the shear wave. FIGS. 17a-17d correspond to FIGS. 16a-16d, but show traces derived in accordance with the third implementation of the invention. Note that in FIGS. 16a-16d there is a leakage, particularly of the compressional wave into the reconstructed shear wave. There is also a distortion of the waves, e.g. the amplitude distortion of the first compressional wave arrival near the ends of the depth interval of layer 4. Note also that FIGS. 17a-17d, derived in accordance with the third implementation of the invention, show improved separation and less distortion. The results still show imperfections which is largely attributed to the fact that the wavefronts are not planar, but are curved, as well as to error in the velocity analysis. Note that the VSP data used in the example of FIGS. 15a-17d is for a setting in which the source is 30 meters below the surface at 250 meters from the borehole. This departs from a fundamental assumption in the process, i.e. the assumption that there is no substantial variation of total wavefield in a direction transverse to the x,z plane of interest. The results are believed to be considerably superior to those of known prior art processes for separating compressional and shear waves, and demonstrate good tolerance of the invented process to real-life measurement constraints.

For the sake of expediency, the results discussed above in connection with FIGS. 16a-16d were actually generated with the single transform procedure (the third implementation of the invention), but using a cruder filter which does not incorporate local apparent seismic velocity information. The inventors believe that the results closely resemble those obtainable by the actual double transform approach (the first implementation of the invention), and therefore that they can serve for a fair comparison between the first and third implementations of the invention.

Figure 18A:
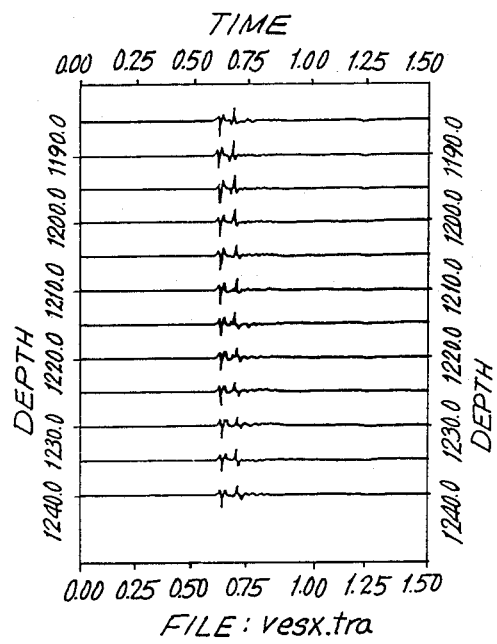
FIG. 18a illustrates the local estimate of the horizontal seismic energy in layer 11 of the subsurface formation illustrated in FIG. 15a, FIG. 18b illustrates the local estimates of vertical seismic energy in the same layer 11.
Figure 18B:
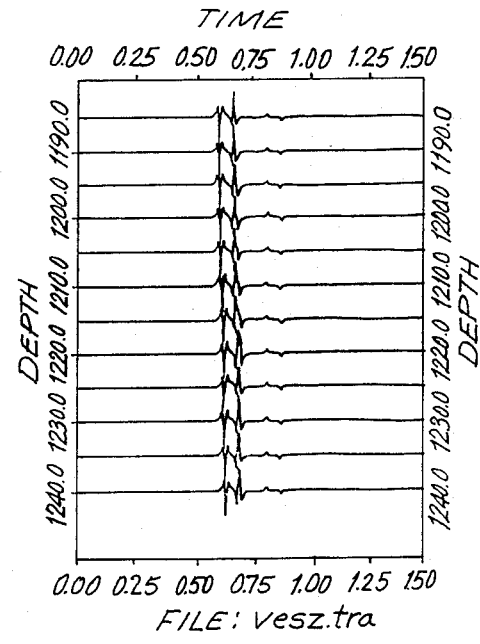
FIG. 18c illustrates predominant velocities (slowness) estimated from the measurements shown in FIG. 18a, and FIG. 18d illustrates predominant velocities (slowness) estimated from the measurements shown in FIG. 18b.
Figure 18C:
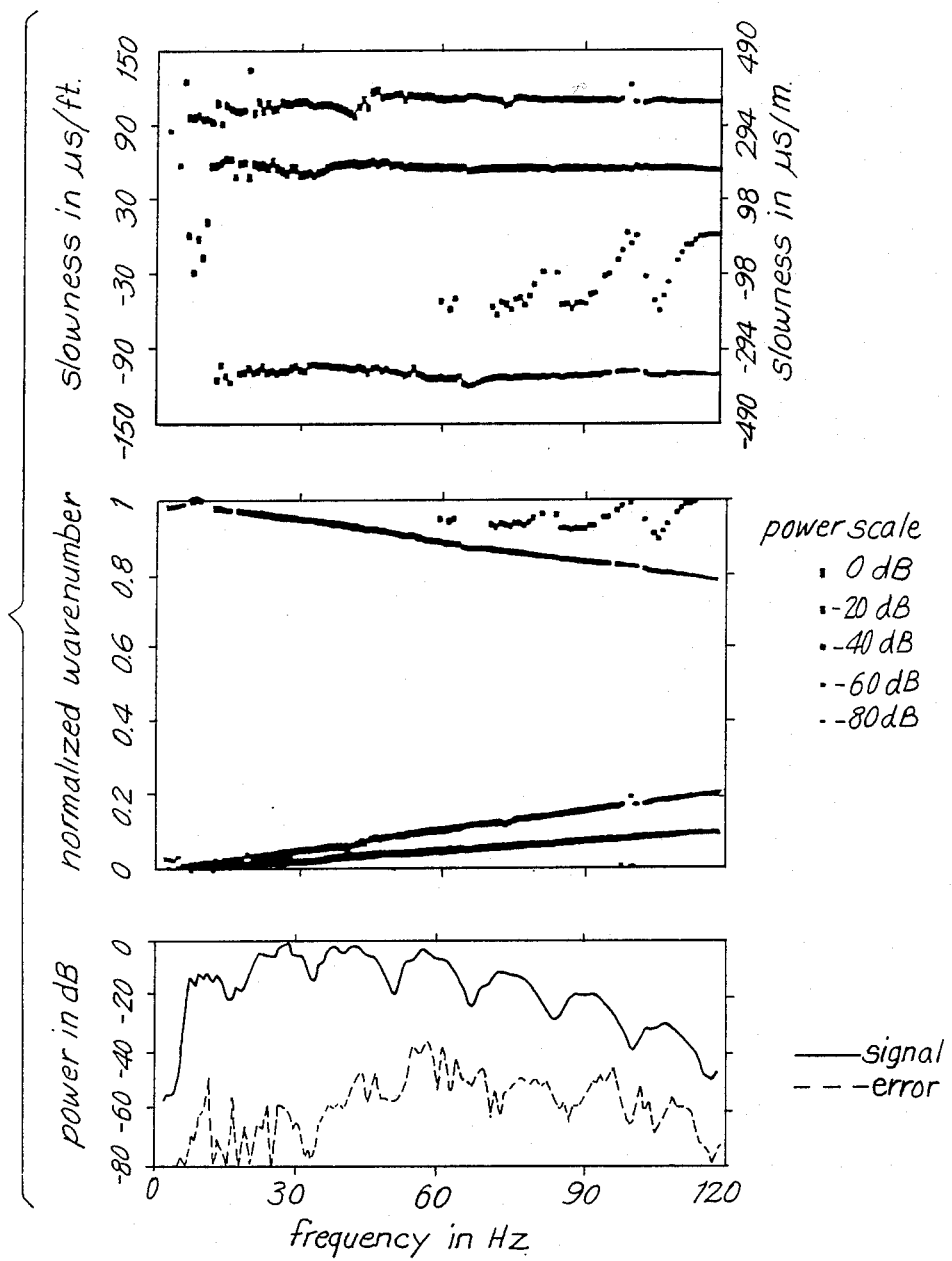
Figure 18D:
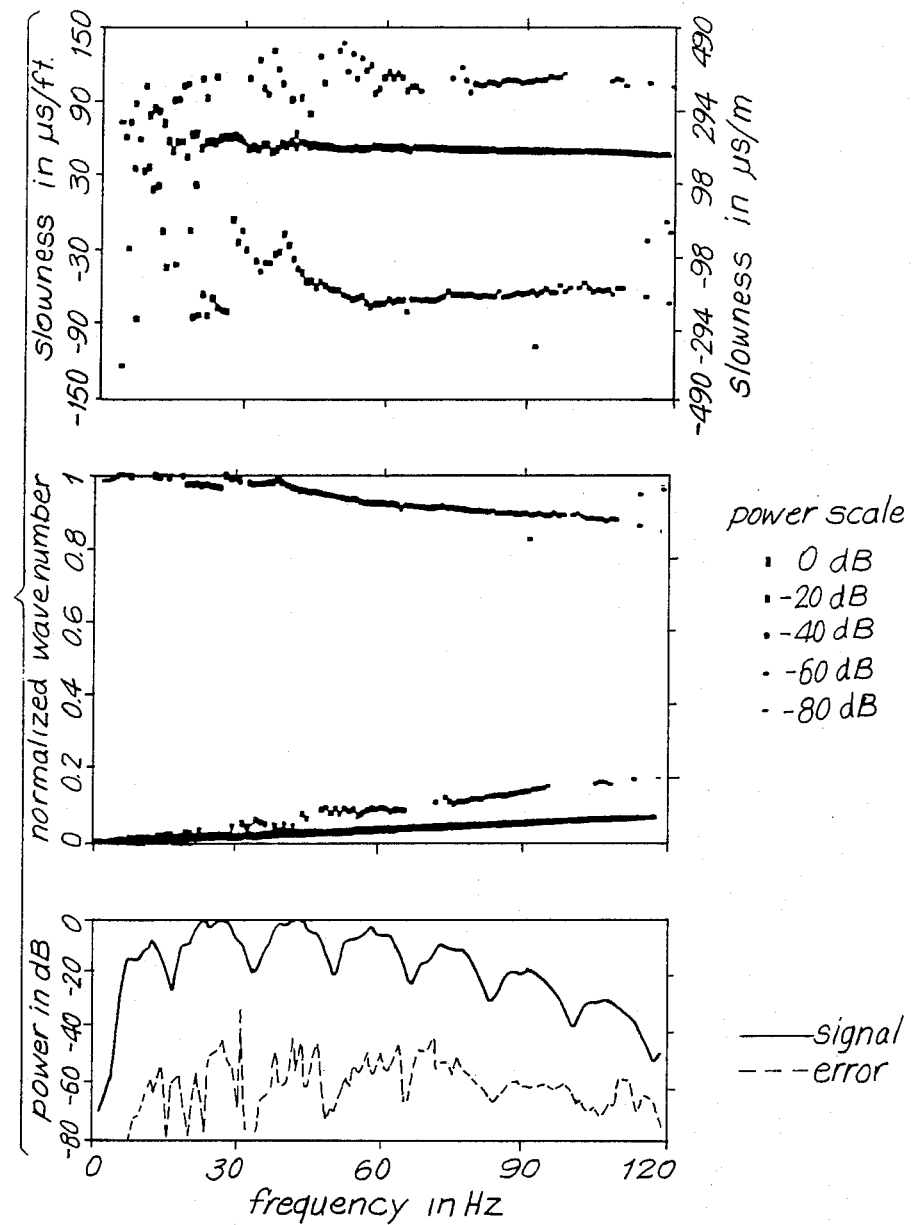
Figure 19A:
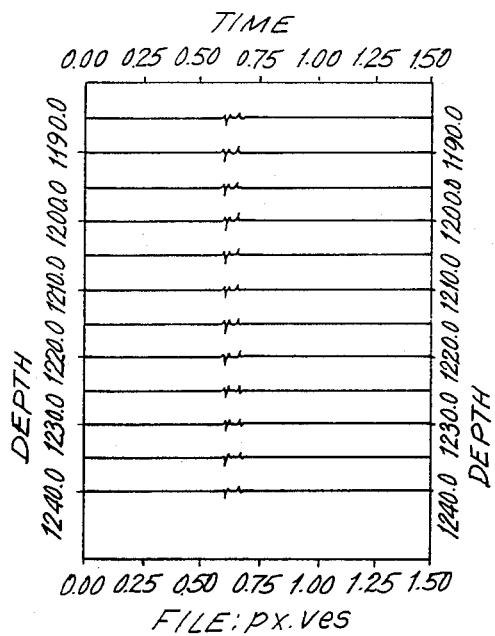
FIGS. 19a, b, c & d correspond to FIGS. 16a–16d and are estimates of the compressional and shear waves in layer 11 derived in accordance with one embodiment of the invention.
Figure 19B:
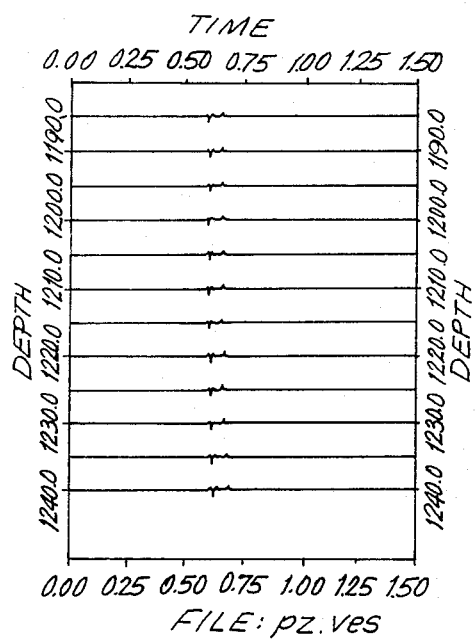
Figure 19C:
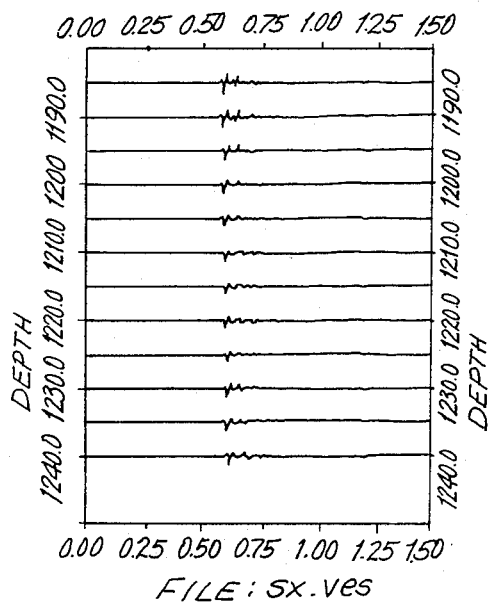
Figure 19D:
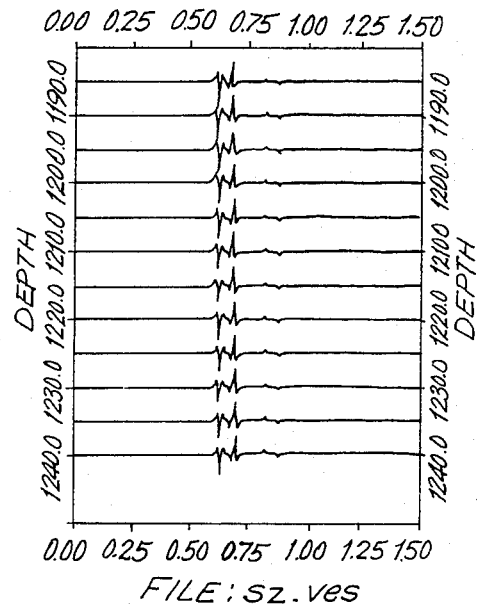
Figure 20A:
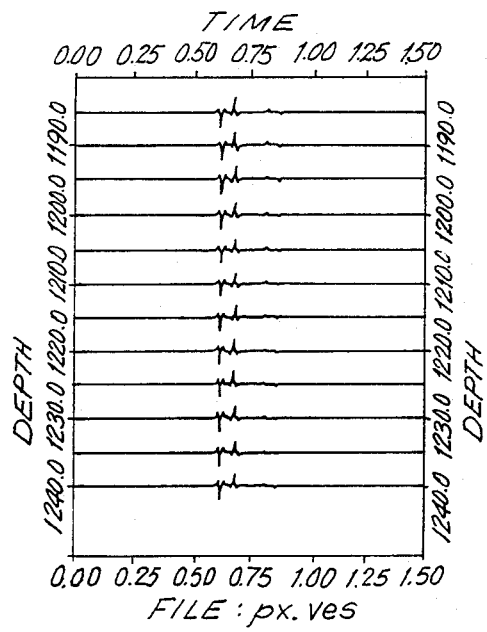
FIGS. 20a, b, c & d are estimates which correspond to those shown in FIGS. 19a–19d but are derived in accordance with another embodiment of the invention.
Figure 20B:
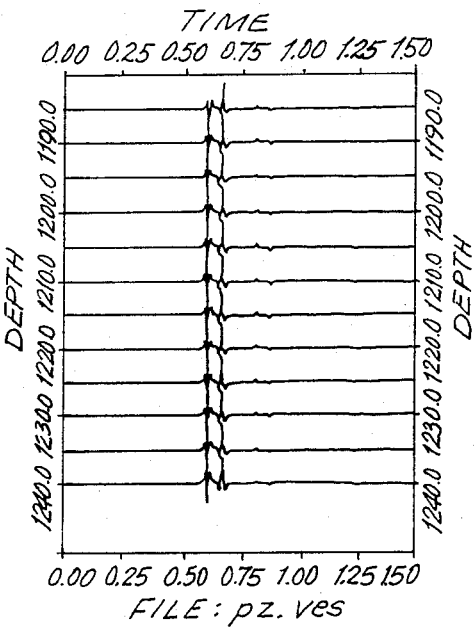
Figure 20C:
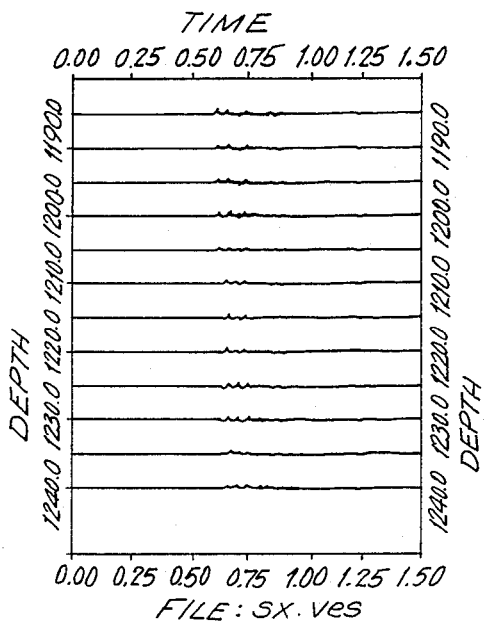
Figure 20D:
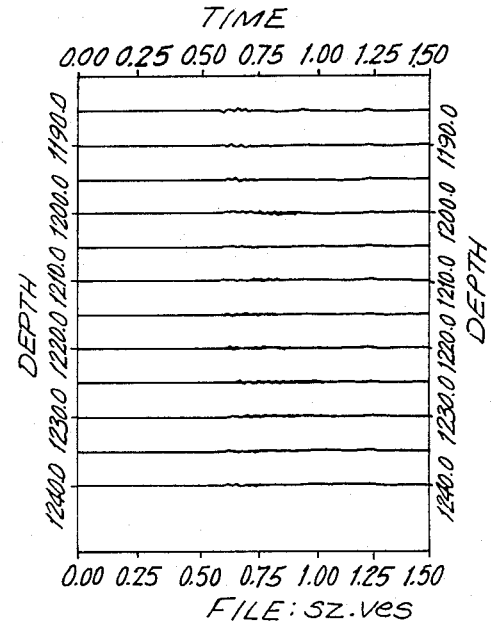

Another example, which largely removes the effects of total wavefield variation in a direction transverse to the x,z plane of interest, is illustrated in FIGS. 18a-20d. FIGS. 18a and 18b show the local wavefield components in the horizontal and vertical directions respectively derived from the total wavefield for layer number 11 in FIG. 8, from 1185 to 1240 meters, at 5-meter intervals, where the total wavefield varies less in the y-direction. Analysis of the horizontal and vertical components reveals the presence of four predominant velocities, two travelling downward and two upward, as depicted in FIGS. 18c and 18d. FIGS. 19a-19d correspond to FIGS. 16a-16d, but are for the measurements discussed in connection with FIGS. 18a-18d and are derived in accordance with the first implementation of the invention. FIGS. 20a-20d correspond to FIGS. 19a-19d, but are derived in accordance with the third implementation of the invention. Note that the separation and distortion are much improved as between the results shown in FIGS. 19-19d on the one hand and the results shown in FIGS. 20a-20d on the other hand.

A way to conceptualize the third implementation of the invention is to focus on the discovery that beneficial use can be made of the recognition that filters with a spatially finite impulse response can be implemented substantially exactly on seismic measurements from a finite depth interval, but that the frequency-wavenumber responses of such filters only approximate the desired frequency-wavenumber response. With seismic measurements, much of the energy can be concentrated along a few rays in frequency-wavenumber space, corresponding to a small number of dominant velocities. The frequency-wavenumber response of the finite-length filters can be made to coincide substantially exactly with the desired response on these rays, minimizing the error in the reconstructed compressional and shear waves. Separate filters can be designed for each depth point; the resulting collection of filters can be thought of as a single shift-varying (i.e. depth-varying) filter. As earlier discussed, in VSP measurements the assumed geometry is that the receiver array lies along the z axis and records the vector particle motion (or particle velocity) caused by elastic waves propagating across the array. In conceptual terms, the overall purpose of the process is to decompose the measured vector particle motion (or particle velocity) into its compressional and shear parts, which correspond respectively to the longitudinal and transverse parts of the elastic waves. The decomposition can be done uniquely if the wavefield recorded by the array is two-dimensional and corresponds to the P-waves and SV-waves propagating in a single plane which is taken here to be the xz plane. With this assumption, particle motion in the plane is due solely to P-waves and SP-waves while any out-of-plane particle motion (i.e. in the y direction) is due to SH-waves and can thus be neglected in doing the separation. For this conceptualization, assume that $u(x,z,t)=[u_x,u_z]^T$ stands for a two-dimensional elastic wavefield in the xz plane, with components $u_z$ along the array (e.g. along the borehole axis) and $u_x$ perpendicular to the array. Assume further that all sources of the seismic wavefield lie in the region of negative values of x, and that the medium in which the seismic wavefield propagates is homogeneous for values of $x=0$ or greater, with compressional wave speed alpha and shear wave speed beta. Then in the region of $x=0$ or greater, the elastic wavefield can be expressed as a superposition of compressional waves and shear waves as follows:

$$u(x,z,t) = \quad (14)$$

$$\frac{1}{4\pi^2} \int_{-\infty}^{\infty} d\omega \int_{-\infty}^{\infty} dk [pa_p(k,\omega) e^{j e^T x} + s^\perp a_s(k,\omega) e^{j s^T x}] e^{-j\omega t}.$$

The first term in brackets above is a plane compressional wave with scalar amplitude $a_p$ and propagation vector p; the second term is a plane shear wave with scalar amplitude $a_s$ and propagation vector s. The angular frequency is denoted by omega; k is the wavenumber along the z axis; $x=[x,z]^T$; and $s^\perp$ is a vector perpendicular to s, defined as $s^\perp=[s_z, -s_x]^T$.

The propagation vector p and s must satisfy the dispersion relations for compressional waves and shear waves, respectively, in the homogeneous halfspace $x>0$. We thus have $$p = [\sqrt{\omega^2/\alpha^2 - k^2}, k]^T, \text{ and } s = [\sqrt{\omega^2/\beta^2 - k^2}, k]^T,$$

where the positive square root is chosen for $|k|<\omega/\alpha$ or $\omega/\beta$ respectively. For wavenumbers whose magnitudes exceed these limits, the positive imaginary square root is chosen for positive $\omega$ and the negative imaginary square root for negative $\omega$. This choice ensures that the wavefield given by equation (1) satisfies appropriate radiation conditions as $x \to \infty$.

The amplitudes $a_p$ and $a_s$ of the planewave components in equation (14) can be determined from the total field recorded by the array $u(0,z,t)$. To show this, take the Fourier transform of u in z and t at $x=0$:

$$u(0,k,\omega) = \quad (15)$$

$$\int_{-\infty}^{\infty} dz \int_{-\infty}^{\infty} dt\, u(0,z,t)\, e^{-j(kz-\omega t)} = p a_p(k,\omega) + s^\perp a_s(k,\omega),$$

where the second equality above follows from equation (14) and the properties of the Fourier transform. This vector equation can be solved for $a_p$ and $a_s$ by taking in turn its inner product with the vectors s and $p^\perp$, where $p^\perp$ is defined as $[p_z,p_x]^T$. This gives $$a_p(k,\omega) = \frac{s^T u(0,k,\omega)}{s^T p} \quad (16)$$

and $$a_s(k,\omega) = \frac{(p^\perp)^T u(0,k,\omega)}{s^T p}. \quad (17)$$

Equations (14), (16), and (17) yield the following expression for the compressional part of the wavefield $u_p$:

$$u_p(x,z,t) = \quad (18)$$

$$\frac{1}{4\pi^2} \int_{-\infty}^{\infty} d\omega \int_{-\infty}^{\infty} dk \frac{ps^T}{s^T p} u(0,k,\omega) e^{j(p^T x - \omega t)}.$$

Equation (18) is valid everywhere in the region $x \geq 0$. But since the only interest is in decomposing the observed field into its compressional and shear parts, expression (18) can be simply evaluated at $x=0$ to obtain $$u_p(0,z,t) = \quad (19)$$

$$\frac{1}{4\pi^2} \int_{-\infty}^{\infty} d\omega \int_{-\infty}^{\infty} dk \frac{ps^T}{s^T p} u(0,k,\omega) e^{j(kz - \omega t)}.$$

The integrals in (19) are inverse Fourier transforms which involve the product of the transformed data $u(x=0,k,w)$ with the multi-channel filter $$P(k,\omega,\alpha,\beta) = \frac{ps^T}{s^T p} = \frac{1}{p_x s_x + p_z s_z} \begin{bmatrix} p_x s_x & p_x s_z \\ p_z s_x & p_z s_z \end{bmatrix}. \quad (20)$$

where the components depend on the compressional and shear wavespeeds in the halfspace as well as on k and omega.

Note that $P(-k,-\omega)=P^*(k,\omega)$, hence the impulse response of this filter is purely real, as required. The filter P passes plane P-waves undisturbed and annihilates plane SV-waves. The filter is a projection operator in the formal sense that $P^2=P$. This filter is a "fan" filter, since it is constant along radial lines in the kw plane. This can be shown with the substitution $\omega=vk$, where v corresponds to apparent velocity along the receiver array. The SV-component of the data can be determined by subtracting the reconstructed P-component from the data.

The separation requires that accurate measurements of the vertical and horizontal particle motions be made, although these particle motions may be convolved with identical instrument impulse responses without affecting the separation. The separation given by equation (19) is exact only when the wavefield is two-dimensional; that is, there is no velocity variation or source variation in the y-direction, and when the formation is homogeneous in a halfspace that contains the receiver array. In practice, these conditions can be relaxed somewhat, as discussed above, particularly in connection with FIGS. 15a–20d. The most important condition is that the measurements contain little in terms of out-of-plane arrivals. Then, if the wavefield at the receiver array is approximately constant in the out-of-plane direction, the difference between the true 3-D geometry and 2-D geometry implicit in equation (19) should not produce large artifacts. Finally, if the formation is not homogeneous along the receiver array, it is possible to apply these equations in each homogeneous section and patch the results together. The success of this approach depends to a large extent on how well the filter P can be approximated when limited data are available.

As discussed in connection with FIG. 14, in a particular implementation of the concept suggested by expression (19), the first step consists of Fourier transforming each waveform in time. Intermediate stages process transform samples at each temporal frequency independently. Finally, the transform samples of the reconstructed P-component will be produced and these will be inverse transformed (in time) to obtain the reconstructed P-component time waveforms. The reconstructed P-component is subtracted from the starting waveforms to obtain the reconstructed SV-component. Advantage can be taken of the fact that the starting and reconstructed waveforms are real-valued by computing and performing the intermediate processing on only the temporal transform values for positive frequencies. The intermediate processing, performed independently at each temporal frequency, can be characterized as a multi-channel spatial filtering operation. The desired spatial frequency response of this filtering operation is given by the matrix $P(k,\omega,\alpha,\beta)$. defined in expression (20). There are actually four single-channel filters to be implemented. The filters have a real-valued transfer function for $|k|<\omega/\alpha$ and may be complex-valued for greater spatial frequencies. This is a consequence of the fact that compressional waves must be decaying in amplitude for $|k|>\omega/\alpha$ and shear waves must be decaying in amplitude for $|k|>\omega/\beta$. Moreover the problem of separating the P- and S-components becomes increasingly noise sensitive as $|k|$ increases beyond these cutoffs, as evidenced by the rapidly increasing magnitudes of the filter transfer functions. Motivated by these considerations, it is believed to be a reasonable and convenient assumption that only S-waves are present for $\omega/\alpha<|k|<\omega/\beta$ and that only noise is present for $|k|>\omega/\beta$. Therefore the desired filter responses are modified to make these responses real-valued.

In discussing a procedure to design each of the single channel filters it can be useful to simplify the notation somewhat. Assume that the waveforms are recorded at depths $z_n=z_0+n\Delta z$. Let $$x(n) = \int_{-\infty}^{\infty} dt\, u(0,z_n,t)e^{j\omega t},$$

i.e. samples of the Fourier transforms of each waveform at a frequency omega which is suppressed in this notation. Let $\tilde{h}(k)=P_{ij}(\omega,k\Delta z,\alpha,\beta)$, the normalized wavenumber response of a component of the (modified) multi-channel filter, at a particular temporal frequency omega, for a medium with velocities alpha and beta. The indices ij identifying the component, the temporal frequency, and the medium velocities are suppressed in this notation.

Consider the shift-varying filter specified by the unit sample response $h_m(n)$, where $$y(m) = \sum_{n=-\infty}^{\infty} h(m,m-n)x(n). \tag{21}$$

The response of such a filter to an input $x(n)=e^{jkn}$ is given by $y(m)=\bar{h}(m,k)e^{jkm}$, where $\bar{h}(m,k)$ is the shift-varying wavenumber response:

$$\bar{h}(m,k) = \sum_{n=-\infty}^{\infty} h(m,n)e^{-jkn}. \tag{22}$$

If the filter is shift-invariant, that is h(m,n) does not depend on m, then this definition of $\bar{h}(m,k)$ reduces to the wavenumber response of the shift-invariant filter, $\bar{h}(k)$.

Consider now the case in which a linear shift invariant filter with impulse response h(n) is applied to an input sequence x(n) that is truncated outside of $0\leq n\leq N-1$. The output sequence is $$y(m) = \sum_{n=0}^{N-1} h(m-n)x(n) = \sum_{n=-\infty}^{\infty} h(m,m-n)x(n), \tag{23}$$

where h(m,n) is defined as $$h(m,n) = \begin{cases} h(n), & m-N+1 \leq n \leq m \\ 0, & \text{otherwise.} \end{cases} \tag{24}$$

Thus, a shift-invariant filter applied to a truncated input can be thought of as equivalent to a finite length shift-varying filter applied to the infinite length input sequence.

The shift varying filters are designed by selecting the N filter coefficients $[h(m,m-N+1),\ldots,h(m,m)]$ so as to $$\min \int_{-\pi}^{\pi} |\tilde{h}(m,k) - \tilde{h}_D(k)|^2 dk \tag{25}$$

subject to the constraints $$\tilde{h}(m,k_i)=\tilde{h}_D(k_i), \quad (i=1,\ldots,P) \tag{26}$$

The solution is of the form $$h(m,n) = h_D(n) - \sum_{i=1}^{P} \lambda_1(m) e^{jk_i[n-m+(N-1)/2]}, \quad (27)$$

where $h_D(n)$ is the impulse response corresponding to the desired frequency response $\tilde{h}_D(k)$. (In the absence of constraints the filter corresponds to convolving the impulse response of the desired frequency response with the truncated input sequence.) By substituting this expression for $h(m,n)$ into the constraint equations, one obtains a set of simultaneous linear equations which can be solved to yield the $\lambda_i(m)$'s:

$$\sum_{p=1}^{P} \frac{\sin[(k_1 - k_p)N/2]}{\sin[(k_1 - k_p)/2]} \lambda_p(m) = \quad (28)$$

$$e^{jk_i[m-(N-1)/2]}[h_D(m,k_i) - h_D(k_i)], \quad (i = 1, \ldots, P),$$

where $$h_D(m,k) = \sum_{n=m-N+1}^{m} h_D(n) e^{-jkn}.$$

The matrix involved is real-valued and symmetric. If the $k_i$ are distinct and $P \leq N$, then it is also positive-definite, hence invertible.

The output signal is given, by the substitution of (27) into (28), by the expression $$y(m) = \sum_{n=0}^{N-1} h_D(m-n)x(n) - \quad (29)$$

$$\sum_{i=1}^{P} \lambda_1(m) \sum_{n=0}^{N-1} x(n) e^{-jk_i[n-(N-1)/2]}.$$

The first part of (29) is a linear convolution of $h_D(n)$ with $x(n)$ and can be implemented using fast convolution techniques. If P is sufficiently small, then the total number of operations is dominated by the computation of the first part of (29), hence is comparable to the number of operations required to implement a shift-invariant filter on the truncated input sequence.

The processing in the third implementation is accomplished in the space-frequency domain by a depth-variant filter whose coefficients are functions of frequency. The depth-variant space-time impulse response of the filter can be obtained by inverse Fourier transformation of the filter coefficients. A modified embodiment of the third implementation can then be carried out entirely in the space-time domain, by directly applying this impulse response to the (rotated) measured wavefield.

The third implementation is applicable to surface seismics, with distance along the surface taking the place of depth in the VSP applications, with the necessary modifications made to the desired filter response to account for the presence of waves reflected from the surface. (See, for example, Dankbaar, J. W. M., "Separation of P and S Waves," presented at the EAEG Meeting, 1984, incorporated by reference in this specification.)

The filters used in the several embodiments of the invention described above bear different notation: J for the first embodiment (which involves filtering in frequency-wavenumber space), D in the case of the slant-stock operation, and P in the third embodiment (which involves filtering in frequency-space domain). These filters are similar in that they are used for the same purpose of filtering out the contributions of shear components of the total wavefield so as to leave an estimate of the compressional component in the plane of interest. As a matter of convenience rather than theory, in both embodiments the filter is set equal to zero after the evanescent P cut-off (k greater than omega divided by vp). However, in tests on real and synthetic seismic measurements it has been found that setting to zero after S evanescence gives results which are believed to be even better.

As will be appreciated by those skilled in the art, the processes described above can be carried out by means of commercially available digital computer equipment which has been programmed and arranged in accordance with the teachings above to carry out the requisite steps. At least some of those steps can be carried out by dedicated equipment; for example the equipment carrying out the functions of units 32 and 40 in FIG. 1 can be commercially available dedicated FFT processors. Others of the relevant process steps can also be carried out by dedicated (hardwired or firmwired processing equipment). In each case, the processing equipment when carrying out the invented processes performs as a special purpose system which derives the requisite measurements of seismic wavefield and the requisite filter and uses them for compressional/shear separation in accordance with the invention. It will also be appreciated that various modifications, alternate constructions and equivalents may be employed without departing from the spirit and scope of the invention and that, therefore, the above description and illustration should not be construed as limiting the scope of the invention, which is defined by the appended claims.

We claim:

1. A seismic exploration method comprising:
   deriving local wavefield components of a total measured seismic wavefield where said components are along selected directions in a selected plane and contain unseparated contributions of local compressional components and shear wave components;
   processing said local wavefield components by means of a shift-varying filter selected in conformance with local estimates of inherent seismic velocities to separate the local components of at least one of the compressional and shear waves; and
   utilizing said separated local components of at least one of the compressional and shear waves.

2. A seismic exploration method as in claim 1 in which said deriving step comprises deriving, for each of a succession of subsurface depth levels z, local wavefield components $u_x$ and $u_z$ which are along respective mutually orthogonal directions and which are measured as functions of time.

3. A seismic exploration method as in claim 2 in which said processing step comprises temporally transforming the local wavefield components $u_x$ and $u_z$ into the space-frequency domain to drive respective transformed components.

4. A seismic exploration method as in claim 3 in which said processing step further comprises operating on said transformed components with said filter in the space-frequency domain to derive filtered component values, which also are in the space-frequency domain.

5. A seismic exploration method as in claim 4 in which said step of operating on said transformed components with said filter comprises carrying out said operating independently for each selected temporal frequency.

6. A seismic exploration method as in claim 5 in which said processing step comprises combining the filtered component values to derive combined values which are in the space-frequency domain and inverting the combined values from the space-frequency domain into the space-time domain to derive the local compressional wave component $u_p$ for depth levels z as a function of time.

7. A seismic exploration method as in claim 6 in which said processing step further comprises subtracting the local compressional wave component $u_p$ for the depth levels z from the total seismic wavefield for the respective depth levels to derive the local shear wave component $u_s$ for the depth levels z as a function of time.

8. A seismic exploration method as in claim 7 in which said processing step further comprises deriving the filter from the total measured seismic wavefield.

9. A seismic exploration method as in claim 8 in which said total measured seismic wavefield comprises vertical seismic profiling (VSP) measurements.

10. A seismic exploration method as in claim 9 in which said VSP measurements are taken with a three-component VSP tool in a borehole through subsurface formations, and the step of deriving said local wavefield components further comprises rotating said measurements to the selected plane and selected directions.

11. A seismic exploration method as in claim 1 in which said step of processing the local wavefield components by means of said filter is carried out substantially in the space-frequency domain, to derive intermediate results in said domain, and the processing step further comprises inverting the intermediate results to the space-time domain to thereby derive the local components of at least one of said compressional and shear waves.

12. A seismic exploration method as in claim 11 in which said total measured seismic wavefield comprises VSP measurements.

13. A seismic exploration method as in claim 1 in which said processing step comprises transforming the local wavefield components from the space-time to the space-frequency domain, applying said filter thereto in the space-frequency domain, to obtain intermediate results, further processing the intermediate results to assemble representations of the local compressional components in the space-frequency domain, and inverting said representations to the space-time domain.

14. A seismic exploration method as in claim 13 in which said total measured seismic wavefield comprises VSP measurements.

15. A seismic exploration method comprising:
deriving estimates of a seismic wavefield propagating through selected subsurface formations along selected coplanar directions at each of a plurality of selected locations, said estimates containing unseparated contributions of both compressional and shear waves propagating in said formations;
deriving a filter which, when applied to the estimates, substantially suppresses the contributions of the shear waves but substantially passes the contributions of the compressional waves, and which is adjusted for selected depth levels to substantially correspond to a selected parameter of the estimates of said seismic wavefield for the respective selected depth levels;
applying said filter to the estimates of said seismic wavefield to thereby drive an estimate of the compressional waves which contribute to said estimates of said seismic wavefield; and
utilizing said estimate of the compressional waves.

16. A seismic exploration method as in claim 15 in which said selected parameter of the estimates of said seismic wavefield comprises a parameter which is a function of dominant apparent velocities which are derived from said estimates of seismic wavefield.

17. A seismic exploration method as in claim 15 in which said step of applying said filter to the estimates of said seismic wavefield to thereby derive an estimate of the compressional waves which contribute to said estimates of seismic wavefield, comprises transforming the estimates of seismic wavefield into the space-frequency domain, and the step of applying said filter comprises applying the filter to the transformed estimates in said space-frequency domain to derive said estimate of the compressional waves in said space-frequency domain, and including the step of inverting the last-recited estimates into the space-time domain.

18. A seismic exploration method comprising:
deriving vector vertical seismic profiling (VSP) measurements for selected depth levels in selected subsurface formations, said VSP measurements characterizing a total wavefield which has compressional and shear wave components, and selecting a plane through said subsurface formations;
deriving dominant apparent velocities for the respective depth levels in said plane at least in part from said VSP measurements;
processing said VSP measurements with a finite-length filter whose wavenumber-frequency is adjusted by depth level to correspond to a desired response for total wavefield concentrated on selected rays in wavenumber-frequency space which correspond to said dominant apparent velocities, to derive an estimate of at least one of the compressional and shear wave components in said plane; and
utilizing said estimate of at least one of the compressional and shear wave components of the total wavefield in said plane.

19. A method comprising:
decomposing 3-component measurements of a measured seismic wavefield into selected local plane wave components;
filtering at least a selected subset of said local plane wave components in the space-frequency domain to identify at least one of the compressional and the shear waves of selected plane wave components of the seismic wavefield represented by said measurements; and
utilizing the identified waves.

20. A method as in claim 19 in which said filtering step comprises deriving a filter which is at least in part a selected function of the measured seismic wavefield.

21. A method as in claim 20 in which said step of deriving a filter further comprises deriving a filter which is at least in part a function of the measured seismic wavefield for a given depth in selected subsurface formations and hence can vary with depth.

22. A method as in claim 21 in which said measured seismic wavefield comprises vertical seismic profiling (VSP) measurements.

23. A method comprising:

decomposing vector measurements of a selected wavefield in a selected medium into selected local plane wave components, said wavefield including both compressional and shear waves;

identifying at least one of the compressional and the shear waves of selected plane wave components of said selected wavefield through the use of a spatially variant filter having a finite impulse response spatially; and utilizing the identified waves.

24. A method as in claim 23 in which said identifying step comprises using said measurements to derive said filter.

25. A method as in claim 23 in which said wavefield is a seismic wavefield and said medium comprises subsurface formations.

26. A method as in claim 23 in which said measurements comprise vertical seismic profiling (VSP) measurements.

27. A seismic exploration method as in claim 1 in which said shift-varying filter is adjusted for selected depth levels to substantially correspond to a function of dominant apparent velocities which are derived from said measured seismic wavefield.

* * * * *